(12) United States Patent
Liebenthal

(10) Patent No.: US 11,128,336 B1
(45) Date of Patent: Sep. 21, 2021

(54) STRUCTURE WITH MOUNTING FIXTURE FOR STABILIZED VIEWING OF PORTABLE DEVICES

(71) Applicant: SurfPlush LLC, Boise, ID (US)

(72) Inventor: John Liebenthal, Boise, ID (US)

(73) Assignee: SurfPlush LLC, Boise, ID (US)

( * ) Notice: Subject to any disclaimer, the term of this patent is extended or adjusted under 35 U.S.C. 154(b) by 0 days.

(21) Appl. No.: 17/033,330

(22) Filed: Sep. 25, 2020

Related U.S. Application Data

(60) Provisional application No. 63/071,786, filed on Aug. 28, 2020.

(51) Int. Cl.
*H04B 1/3877* (2015.01)
*G06F 1/16* (2006.01)

(52) U.S. Cl.
CPC ......... *H04B 1/3877* (2013.01); *G06F 1/1632* (2013.01)

(58) Field of Classification Search
CPC .. G06F 1/1656; G06F 3/03545; G06F 1/1616; G06F 1/1652; G06F 3/017; G06F 3/0412; G06F 3/0416; G06F 12/0891; G06F 13/28; G06F 13/36; G06F 1/1626; G06F 1/163; G06F 1/1681; G06F 1/1686; G06F 1/1688; G06F 1/3287; G06F 1/3296; G06F 2009/45595; G06F 21/32; G06F 2200/1633

USPC ...................................................... 455/575.1
See application file for complete search history.

(56) References Cited

U.S. PATENT DOCUMENTS

| | | | |
|---|---|---|---|
| 8,487,169 B2 * | 7/2013 | Dunlop | F16M 11/2078 84/329 |
| 10,836,326 B1 * | 11/2020 | Yang | B60R 11/0241 |
| 2010/0171021 A1 * | 7/2010 | Smith | A45C 13/30 248/558 |

* cited by examiner

*Primary Examiner* — Ajibola A Akinyemi
(74) *Attorney, Agent, or Firm* — Hawley Troxell Ennis & Hawley LLP; Rivkah Young

(57) ABSTRACT

A structure with mounting fixture allows for viewing of a portable device at a multitude of device viewing angles to accommodate a wide range of user viewing positions. The structure comprises a main body, wherein the main body includes three or more lower stabilizing protrusions and an upper mounting fixture support protrusion. The structure disclosed herein further includes a mounting fixture, wherein the mounting fixture includes one or more device attachment mechanisms and one or more viewing angle adjustment notches. The structure disclosed herein further includes a tethering mechanism, wherein the tethering mechanism attaches the mounting fixture to the main body of the structure.

20 Claims, 22 Drawing Sheets

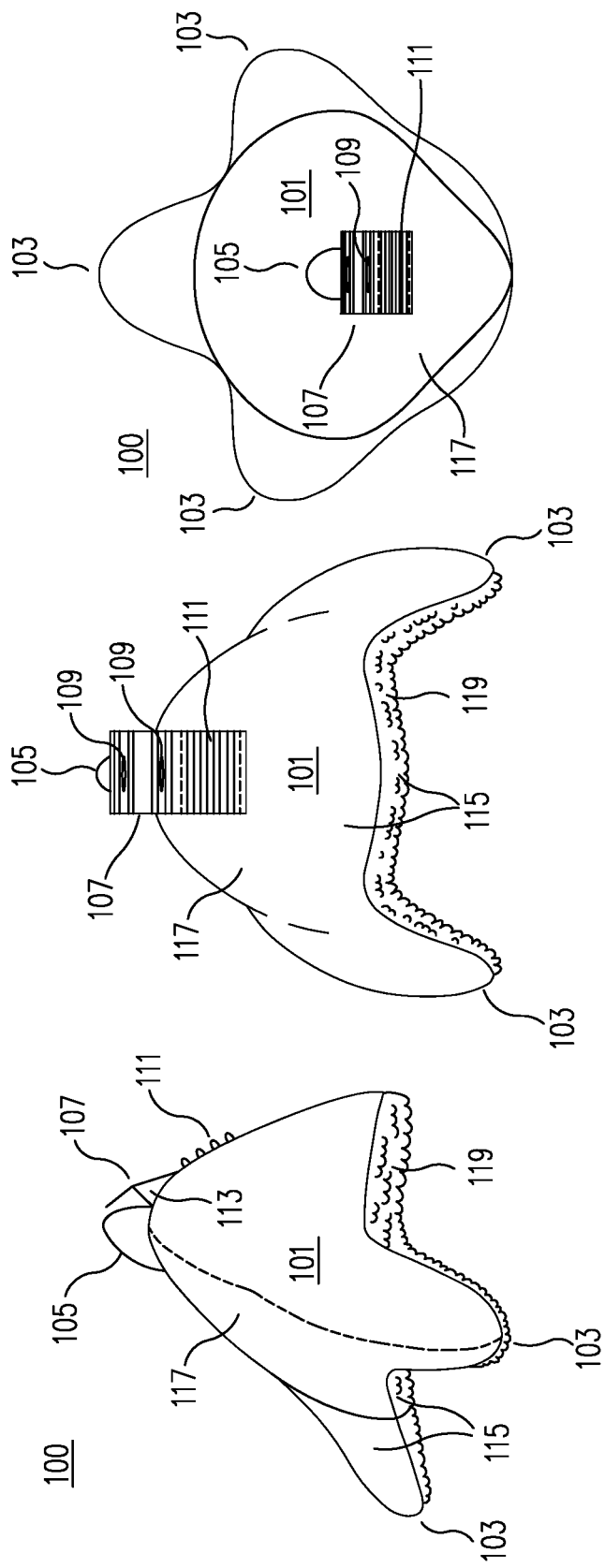

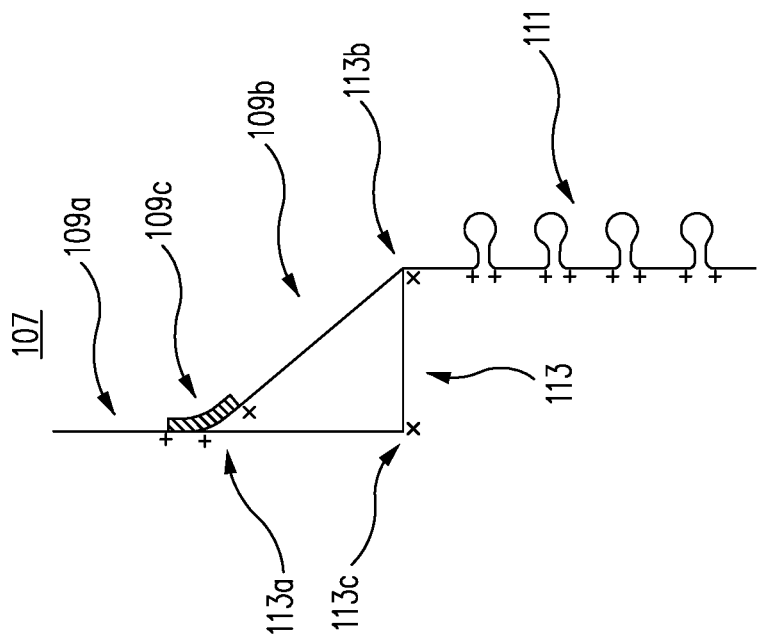
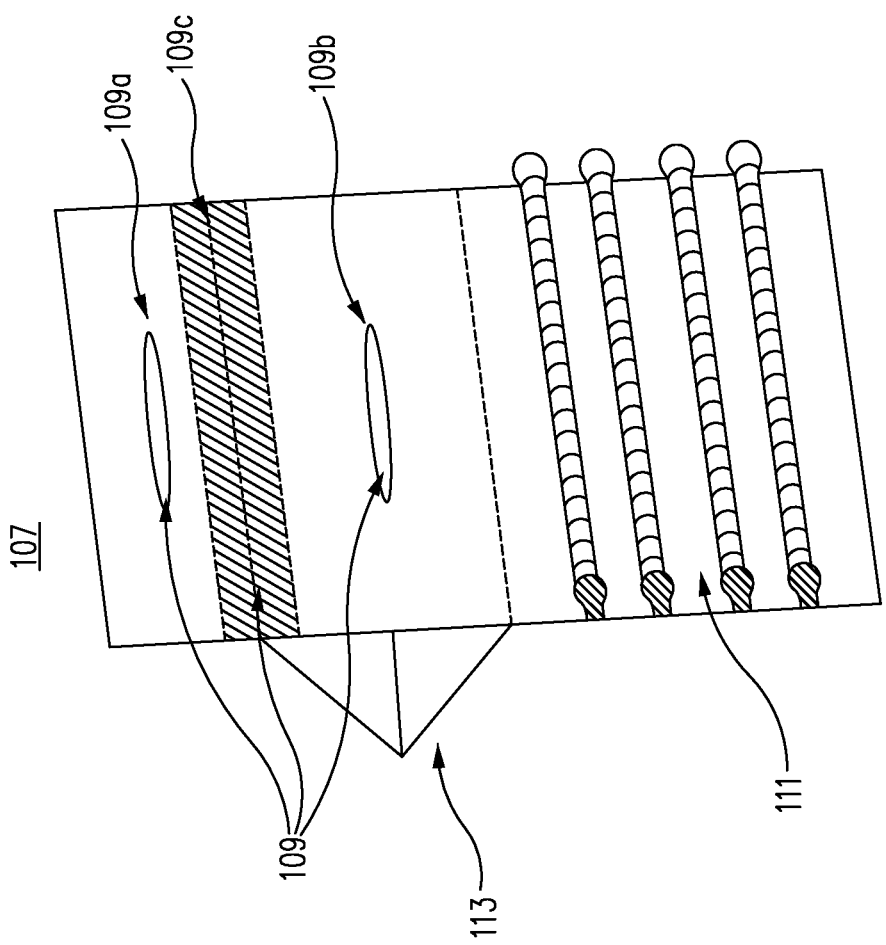

STRUCTURE WITH MOUNTING FIXTURE FOR STABILIZED VIEWING OF PORTABLE DEVICES

RELATED APPLICATION

This application claims the benefit of John Liebenthal, U.S. Provisional Application No. 63/071,786, filed on Aug. 28, 2020, titled "DEVICE WITH ANCHOR MECHANISM FOR STABILIZED VIEWING OF PORTABLE MEDIA PLAYERS," which is hereby incorporated by reference in its entirety as if it were fully set forth herein.

BACKGROUND

In recent years, portable devices, such as portable media players, smart phones, and the like, have become ubiquitous in modern society. Devices such as smart phones were at one time used mainly for activities that were relatively short in duration, such as making and receiving phone calls, sending and receiving emails or text messages, or looking up information on the Internet. However, as these devices have become more sophisticated, a large number of people are increasingly using them for activities that extend for much longer durations. For example, many people currently utilize their portable devices for activities such as watching TV shows and movies, listening to music, reading books, participating in video calls, playing video games, engaging with social media, utilizing a variety of applications for education, entertainment, productivity, and creative pursuits, shopping, and generally browsing the Internet.

Consequently, for many people, their portable devices have almost completely replaced non-portable or semi-portable devices, such as televisions, video game consoles, desktop computers, and laptops. Further, many people have become very attached to their devices, and wish to be able to comfortably use them in a wide variety of locations and settings. For example, a user of a portable device may wish to use their device while partially or fully reclined on a bed, couch, chair, floor, or any other location of the user's choosing. The user may also wish to use their device in a non-reclined position such as standing, or while in motion. However, depending on the user's physical location while utilizing their portable device, as well as the visual acuity of the user (e.g. nearsightedness or farsightedness), the user is often required to assume a number of uncomfortable body positions to allow them to both clearly view and functionally interact with their portable device.

As one example, a user who wishes to watch a movie on their portable device while lying reclined in bed typically needs to position their device at an appropriate viewing distance and angle, and must use one or both hands to hold their device relatively steady for the duration of the movie. When a user holds their device for extended periods of time, such as minutes or hours, the user is prone to experiencing discomfort, pain, fatigue, and soreness in various body parts, such as the hands, wrists, elbows, shoulders, back, and neck. Often, once a user begins to experience discomfort in one body area, the user may shift positions to alleviate the discomfort, which often results in simply transferring the discomfort to another area of the body. For example, a user lying flat on their back and holding their device above their head to view a movie may begin to experience fatigue and discomfort in their arms and wrists. Once the discomfort becomes too great, the user may shift positions to alleviate this discomfort, for example, to lie on their side instead of on their back. However, after remaining in this new position for a length of time, the user may begin to experience discomfort in their neck, back and elbows. Consequently, it is very difficult for the user to be fully relaxed and comfortable while the effort of holding the portable device is required.

In addition to physical discomfort caused by holding portable devices for long durations, it is often very difficult to achieve an optimal viewing and transmission angle when holding a portable device for any length of time. For example, some people use their portable devices to participate in two-way video communications, such as video chats and conference calls. To accomplish this effectively, the user must hold the portable device at a particular angle and with a degree of steadiness sufficient to enable viewing of incoming video and images. Additionally, the user must simultaneously hold the portable device at a particular angle and with a degree of steadiness that enables the front-facing camera of the user's portable device to capture and transmit the user's video and images to others. As the duration of a given video communication increases, the degree of hand, wrist, and arm fatigue grows as well.

Further, as duration of use and user fatigue increases, so does the potential for damage to the portable device. This is especially problematic since many portable devices are expensive to own and expensive to repair. For example, as noted above, when a user is utilizing their portable device for long durations, they may be required to shift into a number of awkward and/or uncomfortable positions to enable continued viewing and use of the device. As the discomfort and fatigue of the user grows, the more likely it becomes that the portable device could fall or be dropped, potentially resulting in damage to the device and/or injury to the user. This is especially the case when the user of the portable device is a child. Damage to the portable device may be minor and/or external such as a cracked screen, dents and/or chips in the exterior of the device. Damage may also be severe, such as internal damage to the electronics, which could potentially result in the portable device becoming unusable.

While some prior art structures exist that facilitate hands-free viewing of portable devices, none of the currently available structures facilitate safe and stable hands-free viewing and use of portable devices across a wide range of reclining and non-reclining positions. For example, some prior art structures include an easel for viewing a portable device, however, this type of structure typically requires the user to be in a position between fully upright and partially reclined. Prior art easel type structures allow a portable device to rest at an angle against one side of the easel, but typically only accommodate a small number of predetermined angles, and they rely on gravity to keep the portable device stationary at the viewing angle predetermined by the easel angle. In order to facilitate a downward-facing screen angle, such as is needed for effective hands-free use of a portable device by a user across a wide range of reclining positions, such a structure must be able to support holding a portable device at an angle less than 90 degrees between the display screen and the plane of the surface on which the structure or the user rests. An easel type structure, such as described above, cannot support holding a device at an angle less than 90 degrees between the display screen and the plane of the surface on which the structure or the user rests, since any angle less than 90 degrees will result in the device tipping over and falling off of the easel.

Some other prior art structures include legs that can be adjusted in height and can also straddle the user's body when the user is partially reclined. This type of structure typically also includes an easel-type platform at one end of the supporting legs. Consequently, this type of structure presents the same problems as the aforementioned easel type structure, in that it relies on gravity to allow the portable device to rest securely on the easel, a system which fails after the device is angled toward the user at an angle of 90 degrees or less. As such, this type of structure also does not facilitate viewing a portable device across a wide range of reclining positions. For example, this type of prior art structure would not facilitate the device viewing angle required while a user of the portable device is reclined on their side. Additionally, the stability of this type of structure relies on its legs which are often difficult to maneuver into a stable position on uneven and shifting surfaces, such as those of a bed or a couch.

Further, many prior art structures for viewing and using portable devices lack portability. Some prior art structures are comprised of either a hinged or "snaking" armature that includes a clamping mechanism on each end. Such structures require a clamping mechanism on a first end to anchor the structure to a stationary object, such as a bedframe or headboard, and require a clamping mechanism on a second end to hold and support the portable device such that the portable device can be viewed by a reclined user. This limits the portability of the structure, since it requires a location with an object to which the structure can be anchored in a way that facilitates effective and functional positioning of the portable device display. This type of structure, therefore, requires a semi-fixed position. If a user wishes to move from a first viewing setting to a second viewing setting, for example, the structure must be detached from its first stationary anchor in the first viewing setting and attached to a second stationary anchor in the second viewing setting, assuming a suitable anchor is available.

In addition to the above issues related to flexibility of device viewing angles, user viewing positions, portability, stability, and safety, another problem with prior art structures is that their form factor often does not conform aesthetically to traditional sets of furnishings in a bedroom, living room, or other leisure activity setting, such as a setting where beds, couches, or recliners are found. Furnishings in many leisure activity settings typically try to emphasize softness, warmth, comfort, fashionable décor, and/or playfulness, in order to promote relaxation of the individuals within the leisure activity setting. Many prior art structures for viewing portable devices are made of firm, angular, cold, metallic, and/or drab materials. As such, the form factor of many prior art structures poses the potential of aesthetic dissonance in traditional reclining settings. Further, such prior art structures also tend to have a much higher degree of firmness than items such as pillows or cushions, which are typically found in a traditional bed or couch ensemble. As such, currently available prior art structures lack curvature to conform the base of the structure to the shape of a user's body, which can make the prior art structures uncomfortable and unpleasant to use. Additionally, in some situations, the firm surfaces of prior art structures can create the possibility of injury. For example, a snaking armature clamped to a bed and holding a device above a reclined user presents the risk of the device coming loose and falling on the user, or the risk of the user sitting up and bumping against the armature.

What is needed therefore, is a structure for facilitating safe and stable viewing and use of a portable device, wherein the structure allows for viewing of the portable device at a multitude of device viewing angles to accommodate a wide range of user viewing positions, including user viewing positions typically required for users who have visual acuity issues, such as nearsightedness or farsightedness. The structure should be able to be picked up and freely moved from one location to another, while allowing the user to adjust the device viewing angle and distance without detaching the portable device from the structure. The structure should not require any tethering or attachment mechanisms that would obstruct the screen of the portable device, and the structure should also not require any stationary anchor, such as a headboard or a bedframe. The structure should provide a secure mechanism for attaching the portable device to the structure, so as to limit the potential for damage to the device and/or injury to the user. The structure should also provide stability and curvature such that, when resting on top of a user's body, the base of the structure comfortably and stably conforms to the shape of the user's body. It would be beneficial for such a structure to also serve as a mount for a front or rear-facing camera of a portable device, and further, to provide a place to store a portable device, such that the device can later be easily found. Further, the structure should provide a physically soft complement to existing reclining furnishings in a user's household or other leisure activity setting, such that the structure promotes relaxation and blends in aesthetically with the user's surrounding environment.

SUMMARY

The structure with mounting fixture for stabilized viewing of portable devices disclosed herein provides solutions to each of the above described problems with prior art portable device viewing structures. For example, the structure disclosed herein allows for viewing of the portable device at a multitude of device viewing angles to accommodate a wide range of user viewing positions, including user viewing positions typically required for users who have visual acuity issues, such as nearsightedness or farsightedness. The structure disclosed herein is able to be picked up and freely moved from one location to another, while allowing the user to adjust the device viewing angle and distance without detaching the portable device from the structure. The structure disclosed herein does not require any tethering or attachment mechanisms that would obstruct the screen of the portable device, and the structure disclosed herein also does not require any stationary anchor, such as a headboard or a bedframe. The structure disclosed herein provides a secure mechanism for attaching the portable device to the structure, so as to limit the potential for damage to the device and/or injury to the user. The structure disclosed herein also provides stability and curvature such that, when resting on top of a user's body, the base of the structure comfortably and stably conforms to the shape of the user's body. The structure disclosed herein can also serve as a mount for a front or rear-facing camera of a portable device, and can also provide a place to store a portable device, such that the device can later be easily found. Further, the structure disclosed herein provides a physically soft complement to existing reclining furnishings in a user's household or other leisure activity setting, such that the structure promotes relaxation and blends in aesthetically with the user's surrounding environment.

In one embodiment, the structure with mounting fixture for stabilized viewing of a portable device comprises a main body, wherein the main body includes three or more lower stabilizing protrusions and an upper mounting fixture support protrusion. In one embodiment, the structure disclosed herein further includes a mounting fixture, wherein the mounting fixture includes one or more device attachment mechanisms and one or more viewing angle adjustment notches. In one embodiment, the structure disclosed herein further includes a tethering mechanism, wherein the tethering mechanism attaches the mounting fixture to the main body of the structure.

In various embodiments, the combination of the upper mounting fixture support protrusion, mounting fixture, device attachment mechanisms and viewing angle adjustment notches allows for viewing of the portable device at a multitude of device viewing angles to accommodate a wide range of user viewing positions. This combination of elements further enables the structure to be picked up and freely moved from one location to another, while allowing the user to adjust the device viewing angle and distance without detaching the portable device from the structure. The tethering or attachment mechanisms utilized by the structure disclosed herein provide a secure mechanism for attaching the portable device to the structure, so as to limit the potential for damage to the device and/or injury to the user. Additionally, the tethering or attachment mechanisms utilized by the structure disclosed herein do not obstruct the screen of the portable device, and the structure disclosed herein also does not require any stationary anchor, such as a headboard or a bedframe.

In one embodiment, the main body of the structure is comprised of a core material. In various embodiments, the main body of the structure is comprised of both an outer casing and a core material. In some embodiments, the outer casing includes one or more mechanisms, such as zippers and/or buttons, for removing the casing from around the core material. In one embodiment, the outer casing is made of two different materials, an upper body casing material and a lower surface casing material. In some embodiments, more than one core material may be used. For example, in one embodiment, the core material used for the lower part of the main body may be different than the core material used for the upper part of the main body.

In various embodiments, the shape, size, and structure of the main body, comprised of core material or outer casing and core material, and including three or more lower stabilizing protrusions, not only enables the structure to be picked up and freely moved from one location to another, but also provides the structure with stability and curvature such that, when resting on top of a user's body, the base of the structure comfortably and stably conforms to the shape of the user's body. In some embodiments, the structure disclosed herein can also serve as a mount for a front or rear-facing camera of a portable device. In other embodiments, the structure disclosed herein provides a place to store a portable device, such that it can later be easily found. Further, the outer casing and the core material of the main body also provide a physically soft complement to existing reclining furnishings in a user's household or other leisure activity setting, such that the structure promotes relaxation and blends in aesthetically with the user's surrounding environment.

Therefore, numerous technical problems with prior art portable device viewing structures are solved by the embodiments disclosed and claimed herein.

BRIEF DESCRIPTION OF THE DRAWINGS

FIG. 1A is a side view of a structure with mounting fixture for stabilized viewing of portable devices, in accordance with one embodiment.

FIG. 1B is a front view of a structure with mounting fixture for stabilized viewing of portable devices, in accordance with one embodiment.

FIG. 1C is an overhead view of a structure with mounting fixture for stabilized viewing of portable devices, in accordance with one embodiment.

FIG. 3A is a perspective view of a mounting fixture including a tethering mechanism, in accordance with one embodiment.

FIG. 3B is a side view of a mounting fixture including a tethering mechanism, in accordance with one embodiment.

Figure 2A:
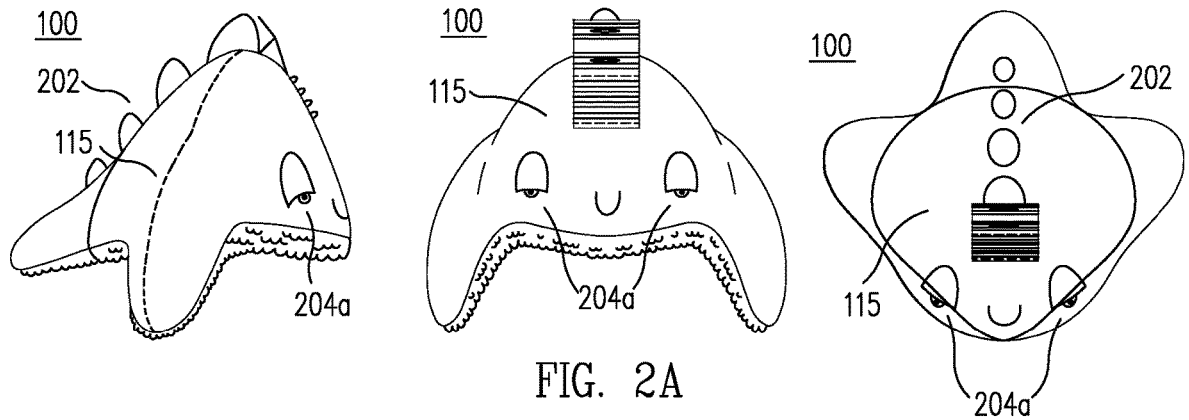
FIG. 2A through FIG. 2C are views of a structure with mounting fixture for stabilized viewing of portable devices, in accordance with several alternative embodiments.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

As noted above, the structure with mounting fixture for safe and stabilized viewing of portable devices disclosed herein allows for a user to view a portable device at a multitude of device viewing angles, which accommodates a wide range of user viewing positions, including user viewing positions typically required for users who have visual acuity issues, such as nearsightedness or farsightedness. The structure disclosed herein is able to be picked up and freely moved from one location to another, while allowing the user to adjust the device viewing angle and distance without detaching the portable device from the structure. The structure disclosed herein does not require any tethering or attachment mechanisms that would obstruct the screen of the portable device, and the structure disclosed herein also does not require any stationary anchor, such as a headboard or a bedframe. The structure disclosed herein provides stability and curvature such that, when resting on top of a user's body, the base of the structure comfortably and stably conforms to the shape of the user's body. The structure disclosed herein can also serve as a mount for a front or rear-facing camera of a portable device, and can also provide a place to store a portable device, such that the device can later be easily found. Further, the structure disclosed herein provides a physically soft complement to existing reclining furnishings in a user's household or other leisure activity setting, such that the structure promotes relaxation and blends in aesthetically with the user's surrounding environment.

As used herein, the term "portable device" refers to a device used to consume media, such as, but not limited to, portable media players, smart phones, tablets, e-book readers, and/or any other portable media devices that may be currently known and/or may be developed after the time of filing.

As used herein, the term "device viewing angle" refers to the angular position of the screen of a portable device with respect to the plane that lies parallel to the surface the structure disclosed herein is resting on. This plane is also sometimes referred to herein as the "plane of rest", "plane of rest of the structure" and/or "plane of rest of the user." Directional terms used herein when referring to the device viewing angle, such as "downwards" and "upwards," refer to whether the screen of the portable device is angled downwards, towards the plane of rest, or upwards, away from the plane of rest. The device viewing angle may also encompass angles of rotation of the device in a clockwise or counter-clockwise motion from a given position of origin. As such, a device viewing angle may be a combination of a downwards or upwards tilt and a clockwise or counter-clockwise rotation.

As used herein, the term "user viewing position" refers to a body position of a user of the structure disclosed herein. For example, user viewing positions may include, but are not limited to, positions such as reclined, semi-reclined, fully reclined, non-reclined, lying on the back, lying on the side, lying on the stomach, sitting, standing, in motion, etc.

FIG. 1A is a side view of structure 100 with mounting fixture for stabilized viewing of portable devices, in accordance with one embodiment.

FIG. 1B is a front view of structure 100 with mounting fixture for stabilized viewing of portable devices, in accordance with one embodiment.

FIG. 1C is an overhead view of structure 100 with mounting fixture for stabilized viewing of portable devices, in accordance with one embodiment.

Referring now to FIG. 1A through FIG. 1C together, in one embodiment, structure 100 includes main body 101, mounting fixture 107, and tethering mechanism 113. In various embodiments, tethering mechanism 113 is utilized to attach mounting fixture 107 to main body 101.

In one embodiment, main body 101 comprises a core material (not shown) and outer casing 115. In one embodiment, outer casing 115 further comprises two distinct parts, upper body casing material 117, and lower surface casing material 119. In one embodiment, main body 101 further comprises lower stabilizing protrusions 103, and upper mounting fixture support protrusion 105. In one embodiment, mounting fixture 107 comprises device attachment mechanisms 109 and viewing angle adjustment notches 111.

In various embodiments, the core material (not shown) of main body 101 may be a material such as, but not limited to, polyester, cotton, wool, bamboo, molded foam, polystyrene foam, polyethylene beads, polystyrene beads, plastic pellets, glass pellets, steel shots, steel beads, dried grains, pebbles, and/or and sand. In one embodiment, the core material includes only one type of material, such as polyester fiber. In other embodiments, the core material may include two or more distinct types of materials. For example, the upper portion of main body 101 may be filled with a polyester fiber, while the lower portion may be filled with polyethylene beads. In some embodiments, the use a heavier material for the lower portion of main body 101 helps structure 100 conform to the shape of a user's body, as well as to provide additional stabilization of structure 100 when in use.

In various embodiments, outer casing 115 of main body 101 is made of a soft and comfortable material, such as, but not limited to, microsuede, plush fabric, velvet, fur, faux fur, fleece, sheepskin, rubberized fabric, cotton, and/or linen. In some embodiments, the outer casing 115 of main body 101 may be comprised of two distinct materials. For example, upper body casing material 117 may be a material such as a plush fabric, while lower surface casing material 119 may be a textured material such as fleece that provides more friction for stability. When structure 100 is in use, the lower part of main body 101 (i.e., the part which is covered by lower surface casing material 119) is intended to be rested on a surface, such as on a bed, couch, table, floor, or on a user's body. Particularly in the case where the lower part of main body 101 rests on a user's body, using a material such as fleece or sheepskin for lower surface casing material 119 adds grip and stability to structure 100. Additionally, using a separate material for lower surface casing material 119 helps to give structure 100 a pleasing aesthetic, and also helps to make structure 100 more comfortable when resting on the user's body.

In some embodiments, there is no outer casing 115, and main body 101 is comprised of only one type of core material, such as, but not limited to, molded foam or polystyrene foam. In some embodiments, main body 101 is an inflatable body, made of a soft, elastic, or semi-elastic airtight material such as neoprene or poly vinyl chloride.

When structure 100 is in use, a portable device (not shown) will have been affixed to the top of main body 101, as will be discussed in additional detail below. Depending on factors such as the weight of the portable device and the type of core material used for main body 101, affixing the portable device to the top of main body 101 has the potential to destabilize structure 100, therefore rendering structure 100 unsuitable for stabilized viewing of the portable device. Thus, the shape of main body 101 is designed such that the combination of the core material and the outer casing 115 material is able to provide an effective counterweight to the pull of gravity on the portable device while the portable device is affixed to main body 101.

In the illustrative embodiment of FIG. 1A through FIG. 1C, main body 101 includes three distinct lower stabilizing protrusions 103, to address the issue of stabilization, as is best shown in FIG. 1C. Although only three lower stabilizing protrusions 103 are depicted in the illustrative embodiment of FIG. 1C, any number of lower stabilizing protrusions equal to or greater than three may be utilized to achieve the same effect. While structure 100 is in use, lower stabilizing protrusions 103 are positioned to counterbalance the weight of any portable device that may be affixed to structure 100, as will be discussed in further detail below. Further, lower stabilizing protrusions 103 are designed such that they conform to the shape of the surface on which structure 100 is resting. For example, if structure 100 is resting directly on a user's body, the left and right lower stabilizing protrusions 103 may curve downward, as shown in FIG. 1B, such that they conform to the shape of the user's body. In one embodiment, if structure 100 is resting on a flat surface, such as a table or floor, then lower stabilizing protrusions 103 may be pushed upwards such that the entirety of lower surface casing material 119 of main body 101 is lying parallel with the flat surface. In other embodiments, depending on the degree of firmness of the lower stabilizing protrusions 103, the lower stabilizing protrusions 103 may hold structure 100 aloft when structure 100 is placed on a flat surface, in which case the lower surface casing material 119 would not fully touch the flat surface. Further, in this specific embodiment, the lower stabilizing protrusions may serve to establish a specific angle of repose of structure 100, as will be discussed in further detail below.

In some embodiments, the same core material(s) (not shown) used for main body 101, as discussed above, may also be used for lower stabilizing protrusions 103. In other embodiments, the core material(s) used for main body 101 may be different than the core material(s) used for lower stabilizing protrusions 103. As one illustrative example, main body 101 may be comprised of a combination of polyester fiber and polyethylene beads, while the lower stabilizing protrusions 103 may be comprised of steel beads or other types of heavily weighted materials, in order to provide maximum stability of structure 100 when in use. It should be noted herein that the above examples are given for illustrative purposes only. In various embodiments of the invention disclosed herein, main body 101 and lower stabilizing protrusions 103 may be comprised of any one core material, or any combination of core materials.

Consequently, the structure disclosed herein provides stability and curvature such that, when resting on top of a user's body, the base of the structure comfortably and stably conforms to the shape of the user's body.

In various embodiments, outer casing 115 may be a variety of different materials, colors and/or patterns to facilitate the aesthetic matching of structure 100 to the materials, colors and/or patterns used for traditional sets of furnishings in a bedroom, living room, or other leisure activity setting. This enables structure 100 to blend in with its surroundings to create an aesthetically pleasing environment whether or not structure 100 is in use. In various embodiments, the materials, colors, and/or patterns of outer casing 115 are selected to emphasize softness, warmth, comfort, fashionable decor, and/or playfulness, in order to promote relaxation of the individuals within the leisure activity setting. In some embodiments, additional features are present on outer casing 115 of structure 100, such that structure 100 is able to resemble a variety of different creatures, characters, or objects.

Figure 2B:
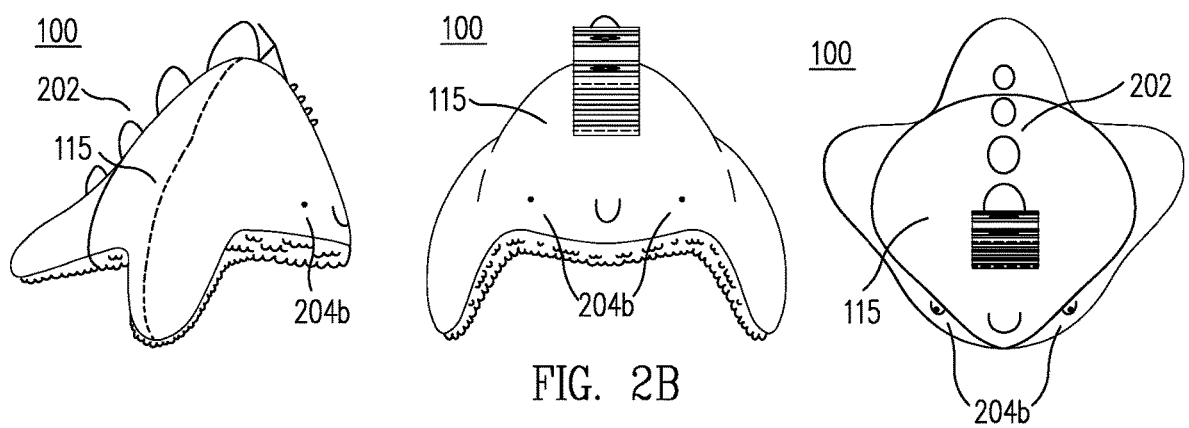
Figure 2C:
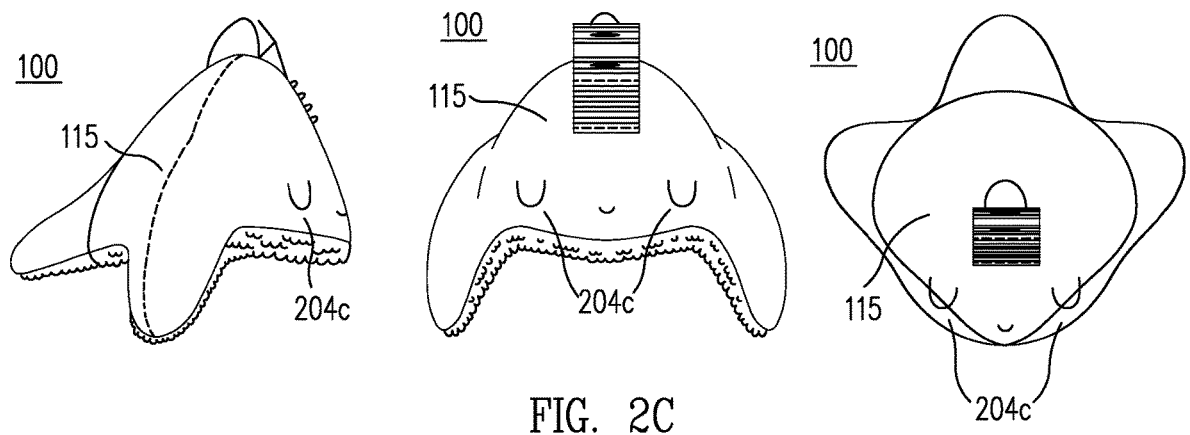

The illustrative examples of FIG. 2A through FIG. 2C are views of structure 100 with mounting fixture for stabilized viewing of portable devices, in accordance with several alternative embodiments.

As can be seen in FIG. 2A through FIG. 2C, various features can be added to outer casing 115 to allow structure 100 to resemble creatures, characters, or objects. For example, the illustrative embodiment of FIG. 2A and FIG. 2B includes horn features 202. The illustrative embodiment of FIG. 2A includes a first type of eye feature 204*a*, the illustrative embodiment of FIG. 2B includes a second type of eye feature 204*b*, and the illustrative embodiment of FIG. 2C includes a third type of eye feature 204*c*. Adding various features to outer casing 115 such that structure 100 resembles a creature, character, or object may be especially desirable in situations where the user of structure 100 is a child, as it may help to promote feelings of comfort and security, especially in a bedroom setting.

As noted above, FIG. 2A through FIG. 2C are provided for illustrative purposes only. Outer casing 115 may be any combination of materials, colors, styles, patterns, and further may include any combination of additional features without departing from the invention as disclosed and as claimed herein. Additionally, in some embodiments, outer casing 115 may include one or more mechanisms for separating outer casing 115 from the core material, such as, but not limited to, zippers, buttons, snaps, ties, and hook and loop materials. Providing a mechanism to allow outer casing 115 to be separated from the core material serves a few useful purposes. For example, if outer casing 115 needs to be washed, it can easily be removed such that it can be washed separately from the core material. Additionally, in some embodiments, if different materials, colors, styles, patterns, or features are desired by the user, then outer casing 115 can be separated from the core material and replaced with a different outer casing 115. For example, in one embodiment, a first outer casing may have features included such that, when the outer casing is placed over the core material, the structure 100 resembles a sea creature. In some embodiments, this first outer casing may be removed and replaced with a second outer casing, which may have different features included, such that, when the second outer casing is placed over the core material, the structure 100 resembles a specific cartoon character. Further, in some embodiments, there is no outer casing 115, and any colors, styles, patterns and features may be directly present on the core material.

Returning now to FIG. 1A through FIG. 1C, structure 100 further includes mounting fixture 107, which in some embodiments is attached to main body 101 by way of tethering mechanism 113. As shown in FIG. 1B, mounting fixture 107 further includes device attachment mechanisms 109 and viewing angle adjustment notches 111. Each of these elements will be discussed in additional detail below. Also shown in FIG. 1A through FIG. 1C is upper mounting fixture support protrusion 105. In various embodiments, upper mounting fixture support protrusion 105 protrudes upward from main body 101 and is situated specifically for the purpose of supporting a portable device when the portable device is mounted on mounting fixture 107. For example, in one embodiment, when a portable device is mounted on mounting fixture 107 and its display screen is positioned at an angle greater than or equal to 90 degrees from the plane of the surface that structure 100 is resting on (such as is shown in FIG. 1A), upper mounting fixture support protrusion 105 keeps the portable device from tipping backwards.

For example, in some embodiments, when the portable device is mounted to the mounting fixture 107 and is positioned at a vertical angle of 90 degrees from a plane of rest, the upper mounting fixture support protrusion 105 enables a display screen of the portable device to be securely tilted at an upward angle from the angle of 90 degrees to an angle of between 91 degrees and 180 degrees from the plane of rest. In some embodiments, when the portable device is mounted to the mounting fixture 107 and is positioned at a vertical angle of 90 degrees from a plane of rest, the tethering mechanism 113 enables a display screen of the portable device to be suspended at a downwards angle from the angle of 90 degrees to an angle of between 89 degrees and 0 degrees from the plane of rest.

FIG. 3A is a perspective view of mounting fixture 107 including a tethering mechanism 113, in accordance with one embodiment.

In various embodiments, mounting fixture 107 is made of a stretch fabric material and includes an upper portion and a lower portion. In one embodiment, the mounting fixture is 3 inches wide. In various other embodiments, the mounting fixture may be between 1.5 and 6 inches wide. In one embodiment, the upper portion of mounting fixture 107 contains one or more device attachment mechanisms 109. Device attachment mechanisms 109 may include any type of mechanism for securing a portable device to mounting fixture 107. In one embodiment, device attachment mechanisms 109 include one or more button holes. In the illustrative example of FIG. 3A, mounting fixture 107 includes two buttonholes, upper buttonhole 109*a* and lower buttonhole 109*b*. In various embodiments, upper buttonhole 109*a* and lower buttonhole 109*b* are designed to accommodate commonly used portable device attachments. For example, some commonly used portable device attachments are grips that attach to the back of a portable device to allow a user of the portable device to more easily hold the portable device while performing a variety of activities. Thus, in one embodiment, the buttonholes are designed to accommodate grips, as well as other types of portable device attachments.

In the illustrative embodiment of FIG. 3A, upper buttonhole 109*a* is positioned specifically such that when a portable device attachment is inserted into upper buttonhole 109*a*, viewing of the portable device in portrait mode is facilitated, while lower buttonhole 109*b* is positioned specifically such that when a portable device attachment is inserted into lower buttonhole 109*b*, viewing of the portable device in landscape mode is facilitated. In the specific illustrative embodiment of FIG. 3A, an additional device attachment mechanism 109, hook and loop fastener 109*c*, is provided such that no specific portable device attachment is required in order to utilize structure 100. For example, if a user of structure 100 does not have a grip or other portable device attachment, they can simply adhere a portion of hook and/or loop material, such as Velcro, to the back of their portable device in order to utilize structure 100, as will be discussed in further detail below.

In one embodiment, when a portable device (not shown) is mounted to mounting fixture 107, the portable device is in a position of origin which is parallel to mounting fixture 107, with the screen of the portable device facing outward and away from mounting fixture 107. In one embodiment, when the portable device is mounted to mounting fixture 107, the portable device is able to be rotated up to 90 degrees clockwise or 90 degrees counterclockwise from the position of origin. In one embodiment, when the portable device is mounted to mounting fixture 107, the portable device is able to be rotated a full 360 degrees clockwise or 360 degrees counterclockwise from the position of origin. Rotation of the portable device while mounted to mounting fixture 107 will be discussed in additional detail below.

It should be noted here that, although device attachment mechanisms 109, as illustrated in FIG. 3A, specifically include upper buttonhole 109*a*, lower buttonhole 109*b*, and hook and loop fastener 109*c*, any other number and type of portable device attachment mechanisms may be utilized to achieve similar functionality. For example, in some embodiments device attachment mechanisms 109 may include slots, magnets, snaps, ties and/or any other type of device attachment mechanism known at the time of filing and/or as developed after the time of filing.

As also shown in FIG. 3A, the lower portion of mounting fixture 107 includes viewing angle adjustment notches 111. Viewing angle adjustment notches 111 are designed and positioned such that one end of a portable device can be rested on top of one of viewing angle adjustment notches 111, in order to adjust the device viewing angle while holding the portable device in place and preventing the portable device from sliding downwards when mounted to mounting fixture 107. In the illustrative embodiment of FIG. 3A, four viewing angle adjustment notches 111 are included as part of mounting fixture 107. In various other embodiments, there may be more or fewer than four viewing angle adjustment notches 111 included as part of mounting fixture 107.

Referring now to FIG. 1A, and FIG. 3A together, in various embodiments, tethering mechanism 113 includes one or more strips of material, which are sewn or otherwise affixed to both mounting fixture 107 and main body 101 of structure 100. Tethering mechanism 113 is utilized to anchor mounting fixture 107 to main body 101 while providing some flexibility with respect to angling mounting fixture 107 downward or upward to achieve an ideal angle for viewing the screen of a portable device, when the portable device is mounted on mounting fixture 107. In various embodiments, tethering mechanism 113 can be made of any type of material that is suitable for securing mounting fixture 107 to main body 101 of structure 100, such as, but not limited to, elastic strap material composed of woven polyester and rubber, cloth, cord, string, rope, nylon, poly cord, rubber, neoprene, polystyrene, polyester, parachute cord, webbing and/or hook-and-loop fasteners.

FIG. 3B is a side view of mounting fixture 107 including tethering mechanism 113, in accordance with one embodiment.

As shown in FIG. 3B, in one embodiment, mounting fixture 107 is made of a flexible stretch fabric, which allows for the different portions of mounting fixture 107 to be positioned at different angles during use. For example, in the illustrative embodiment of FIG. 3B, the portion of mounting fixture 107 that houses upper buttonhole 109*a* is in a vertical position, while the portion of mounting fixture 107 that houses lower buttonhole 109*b* is in an angled position. Further, in one embodiment, one end of tethering mechanism 113 is affixed to mounting fixture 107 at a first location 113*a*, which, in some embodiments is a location near the portion of mounting fixture 107 that houses hook and loop fastener 109*c*. In one embodiment, another end of tethering mechanism 113 is affixed to mounting fixture 107 at a second location 113*b*, which in some embodiments is a location between the upper portion of mounting fixture 107 (which houses device attachment mechanisms 109), and the lower portion of mounting fixture 107 (which houses viewing angle adjustment notches 111).

Referring now to FIG. 1A and FIG. 3B together, in some embodiments, tethering mechanism 113 is affixed to main body 101 at a third location 113*c*, which, in the illustrative embodiment of FIG. 1A, is located just in front of upper mounting fixture support protrusion 105. In some embodiments, tethering mechanism 113 is also affixed to main body 101 at the second location 113*b*, mentioned above.

Although reference has been made herein to a specific type of tethering mechanism 113, as well as specific locations for affixing tethering mechanism 113 to mounting fixture 107 and main body 101, those of skill in the art will readily recognize that other ways of tethering mounting fixture 107 to main body 101 may be utilized, and the invention disclosed herein and claimed below should not be construed as limited to the illustrative embodiments depicted and discussed above.

Figure 3C:
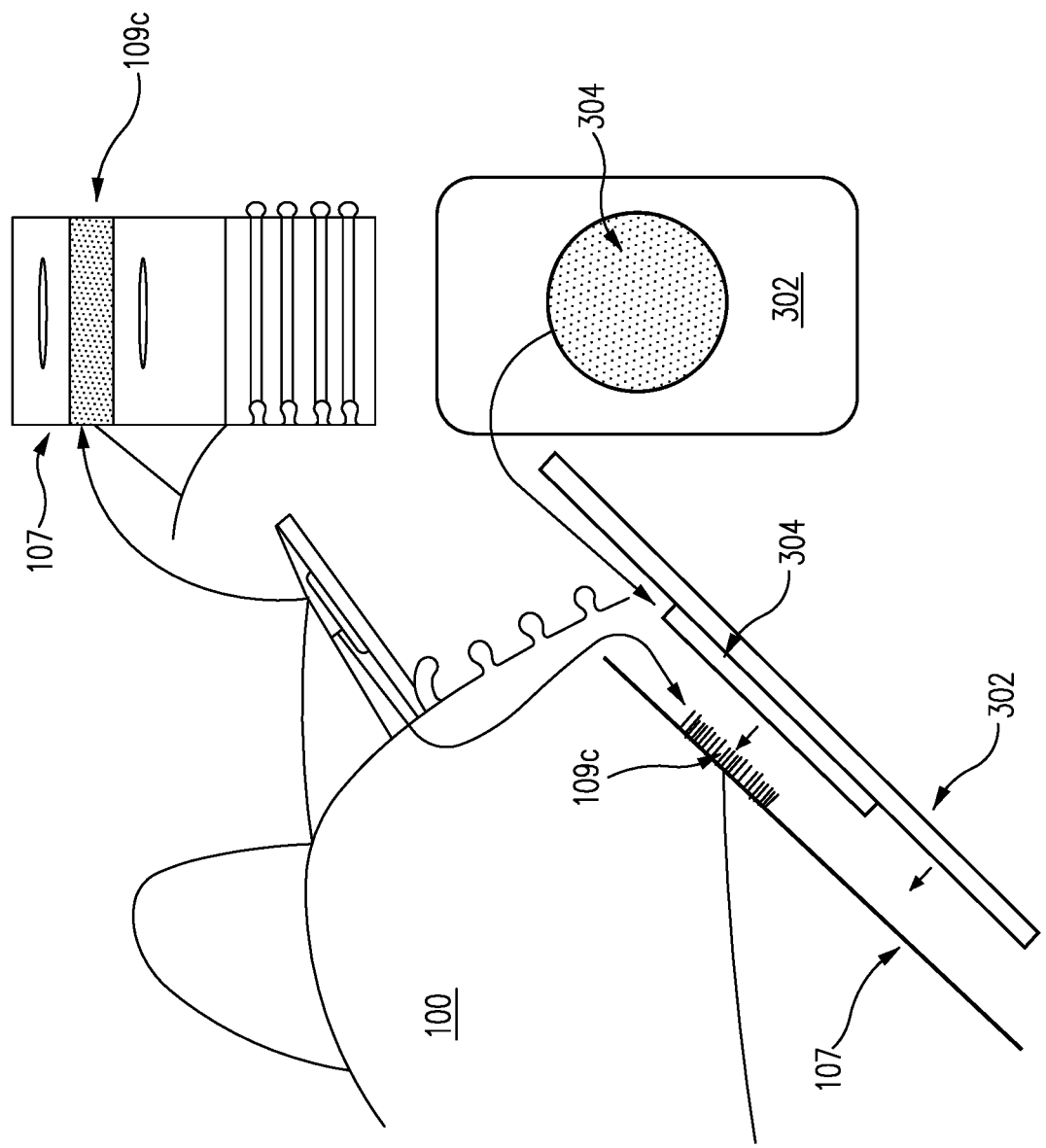
FIG. 3C is a detail view of device attachment mechanisms on a mounting fixture, in accordance with one embodiment.

FIG. 3C is a detail view of device attachment mechanisms on a mounting fixture, in accordance with one embodiment.

Specifically shown in FIG. 3C is a detail view of hook and loop fastener 109*c*. As noted above, hook and loop fastener 109c is provided such that no specific portable device attachment is required in order to utilize structure 100. For example, if a user of structure 100 does not have a grip or other portable device attachment, they can simply adhere a portion of hook and/or loop material, such as loop material portion 304, to the back of their portable device, such as portable device 302. Portable device 302 can then be affixed to mounting fixture 107 by utilizing hook and loop fastener 109c.

Consequently, the combination of viewing angle adjustment notches 111, tethering mechanism 113, and the ability to rotate a portable device while it is mounted to mounting fixture 107, allows for a user to view the portable device at a multitude of device viewing angles, which accommodates a wide range of user viewing positions, including user viewing positions typically required for users who have visual acuity issues, such as nearsightedness or farsightedness. Illustrations depicting a wide variety of device viewing angles and user viewing positions while structure 100 is in use are provided herein and discussed below.

Figure 4A:
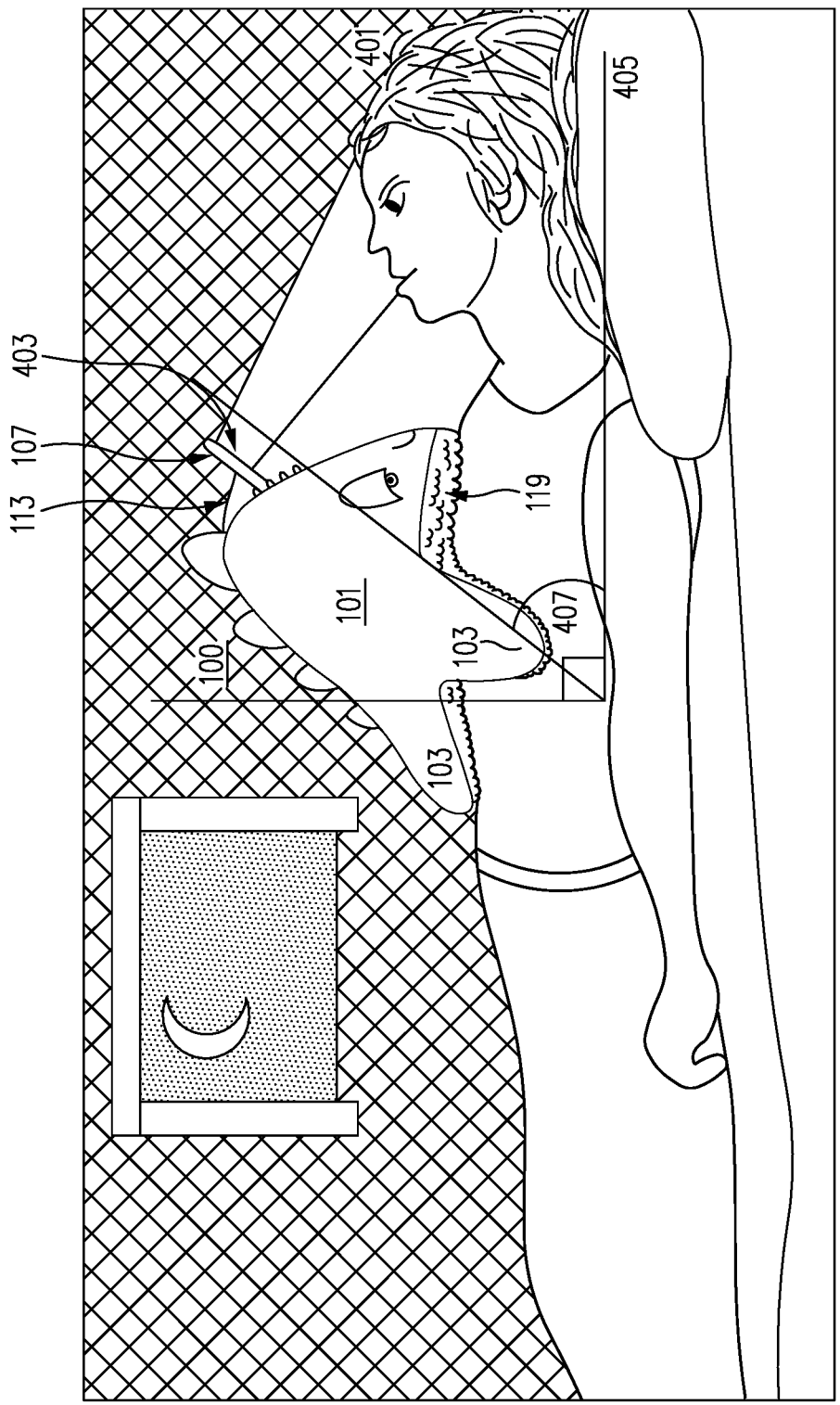
FIG. 4A is an illustration of a structure with mounting fixture for stabilized viewing of portable devices being utilized by a user to view a portable device, in accordance with one embodiment.

FIG. 4A is an illustration of structure 100 being utilized by a user 401 to view a portable device 403, in accordance with one embodiment.

In the illustration of FIG. 4A, user 401 is in a reclined position, watching the screen of portable device 403, while lying flat on her back with her arms at her sides. This figure illustrates lower surface casing material 119 of main body 101 resting on the chest of user 401, and lower stabilizing protrusions 103 of main body 101 conforming to the body of user 401. As can also be seen in FIG. 4A, tethering mechanism 113 is holding mounting fixture 107 at an optimal angle such that user 401 can enjoy a completely hands-free viewing experience.

As discussed above, many prior art structures cannot support holding a device at an angle less than 90 degrees from the plane of the surface on which structure 100 or user 401 rests (hereinafter referred to as resting plane 405). As illustrated in FIG. 4A, in one embodiment, the tethering mechanism 113 allows portable device 403 to be held at an angle 407, which is an angle that is less than 90 degrees from resting plane 405. Because tethering mechanism 113 attaches mounting fixture 107 to main body 101, main body 101 must utilize a variety of stabilization mechanisms in order to counterbalance the pull of gravity on portable device 403 when portable device 403 is held at an angle that is less than 90 degrees from resting plane 405, such as angle 407. As discussed above, and as depicted in FIG. 4A, these mechanisms include the placement of lower stabilizing protrusions 103 of main body 101, as well as the choice of core material used for main body 101. Additionally, the dimensions of main body 101, including the lower stabilizing protrusions 103, play a key role in providing an optimal device viewing angle for a wide variety of reclining or non-reclining user viewing positions, while ensuring stability of structure 100.

Figure 4B:
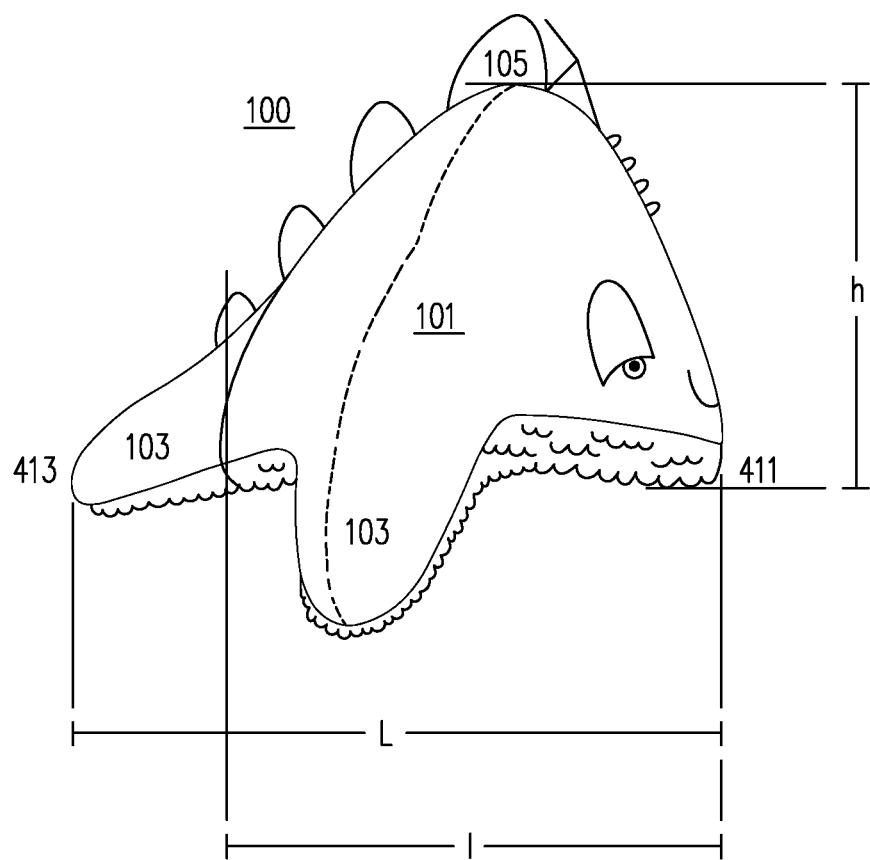
FIG. 4B is a side view of a structure with mounting fixture for stabilized viewing of portable devices, showing potential height and length measurements, in accordance with various embodiments.

FIG. 4B is a side view of structure 100, showing potential height and length measurements of structure 100, in accordance with various embodiments.

In one embodiment, the height h of structure 100, measured from lower front end 411 to the top of main body 101 (not including upper mounting fixture support protrusion 105) is 9.5 inches. In various other embodiments, the height h of structure 100 can be anywhere from 4.75 to 19 inches.

In one embodiment, the length l of structure 100, measured from lower front end 411 to the back of main body 101 (not including lower stabilizing protrusions 103) is 11.5 inches. In various other embodiments, the length l of structure 100 can be anywhere from 5.75 to 23 inches.

In one embodiment, the length L of structure 100, measured from lower front end 411 to lower tail end 413 is 15 inches. In various other embodiments, the length L of structure 100 can be anywhere from 7.5 to 30 inches.

Figure 4C:
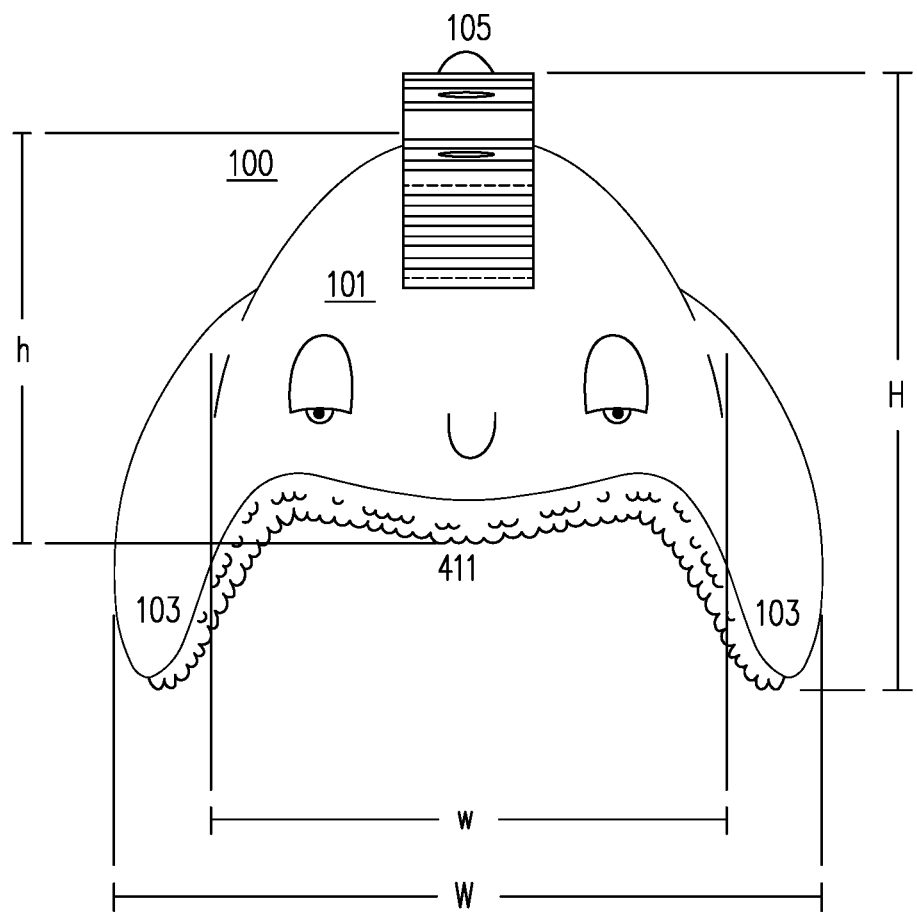
FIG. 4C is a front view of a structure with mounting fixture for stabilized viewing of portable devices, showing potential height and width measurements, in accordance with various embodiments.

FIG. 4C is a front view of structure 100, showing potential height and width measurements of structure 100, in accordance with various embodiments.

In one embodiment, the height h of structure 100, measured from lower front end 411 to the top of main body 101 (not including upper mounting fixture support protrusion 105) is 9.5 inches. In various other embodiments, the height h of structure 100 can be anywhere from 4.75 to 19 inches.

In one embodiment, the height H of structure 100 (including lower stabilizing protrusions 103 and upper mounting fixture support protrusion 105) is 14.5 inches. In various other embodiments, the height H of structure 100 can be anywhere from 7.25 to 29 inches.

In one embodiment, the width w of structure 100 (not including lower stabilizing protrusions 103) is 12 inches. In various other embodiments, the width w of structure 100 can be anywhere from 6 to 24 inches.

In one embodiment, the width W of structure 100 (including lower stabilizing protrusions 103) is 16 inches. In various other embodiments, the width W of structure 100 can be anywhere from 8 to 32 inches.

FIG. 5 through FIG. 19 are illustrations depicting use cases of structure 100 with mounting fixture for stabilized viewing of portable devices in accordance with various embodiments.

Figure 5:
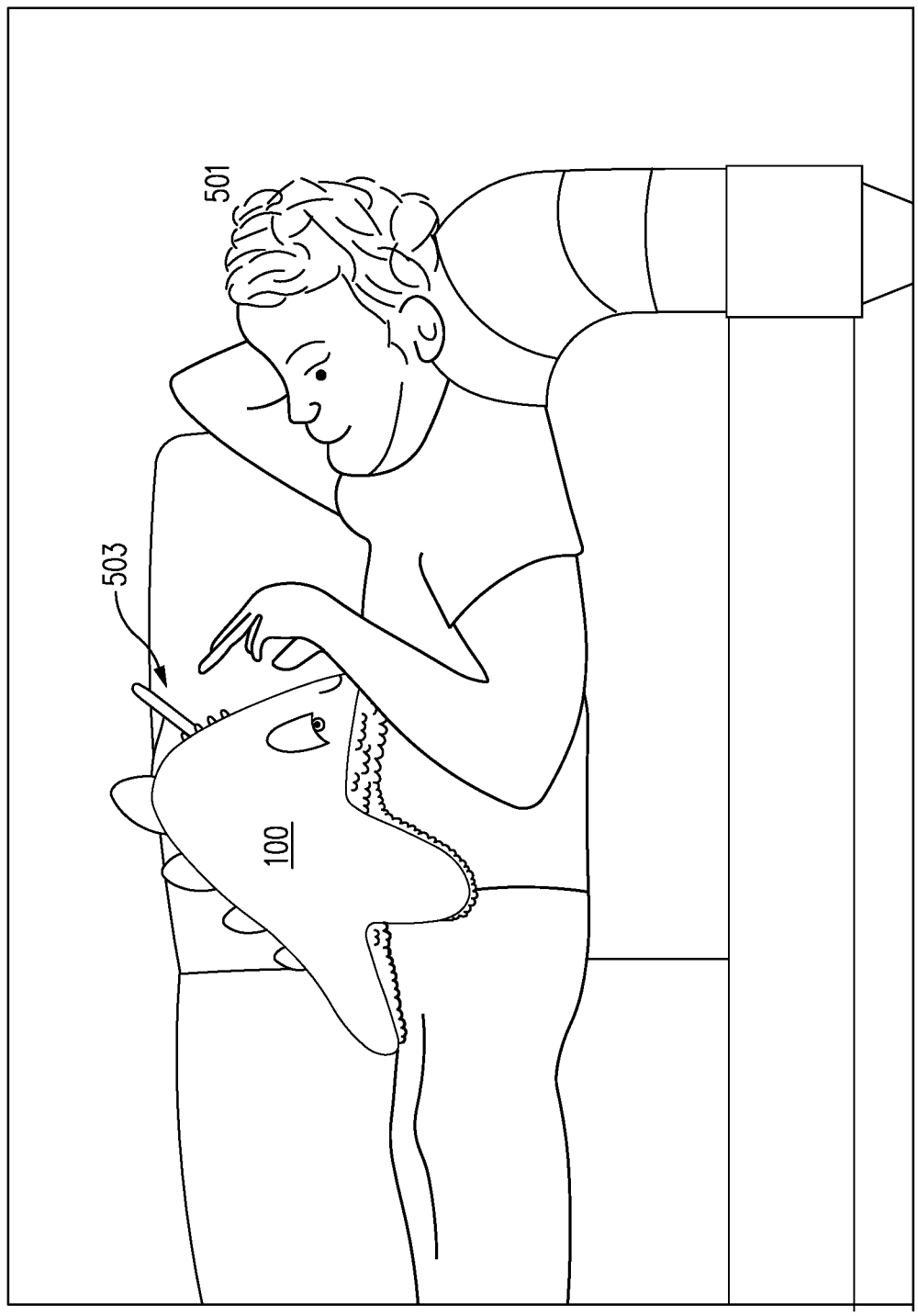
FIG. 5 through FIG. 19 are illustrations depicting use cases of a structure with mounting fixture for stabilized viewing of portable devices in accordance with various embodiments.

FIG. 5 is an illustration of structure 100 being utilized by a user 501 to view and interact with a portable device 503, in accordance with one embodiment. In the illustration of FIG. 5, user 501 is in a reclined position, and is able to view and interact with the touch screen of a portable device 503 without any obstruction of user 501's view or restriction of user 501's touch interactions. Consequently, as illustrated in FIG. 5, the structure disclosed herein does not require any tethering or attachment mechanisms that would obstruct the screen of the portable device, and the structure disclosed herein also does not require any stationary anchor, such as a headboard or a bedframe.

Figure 6:
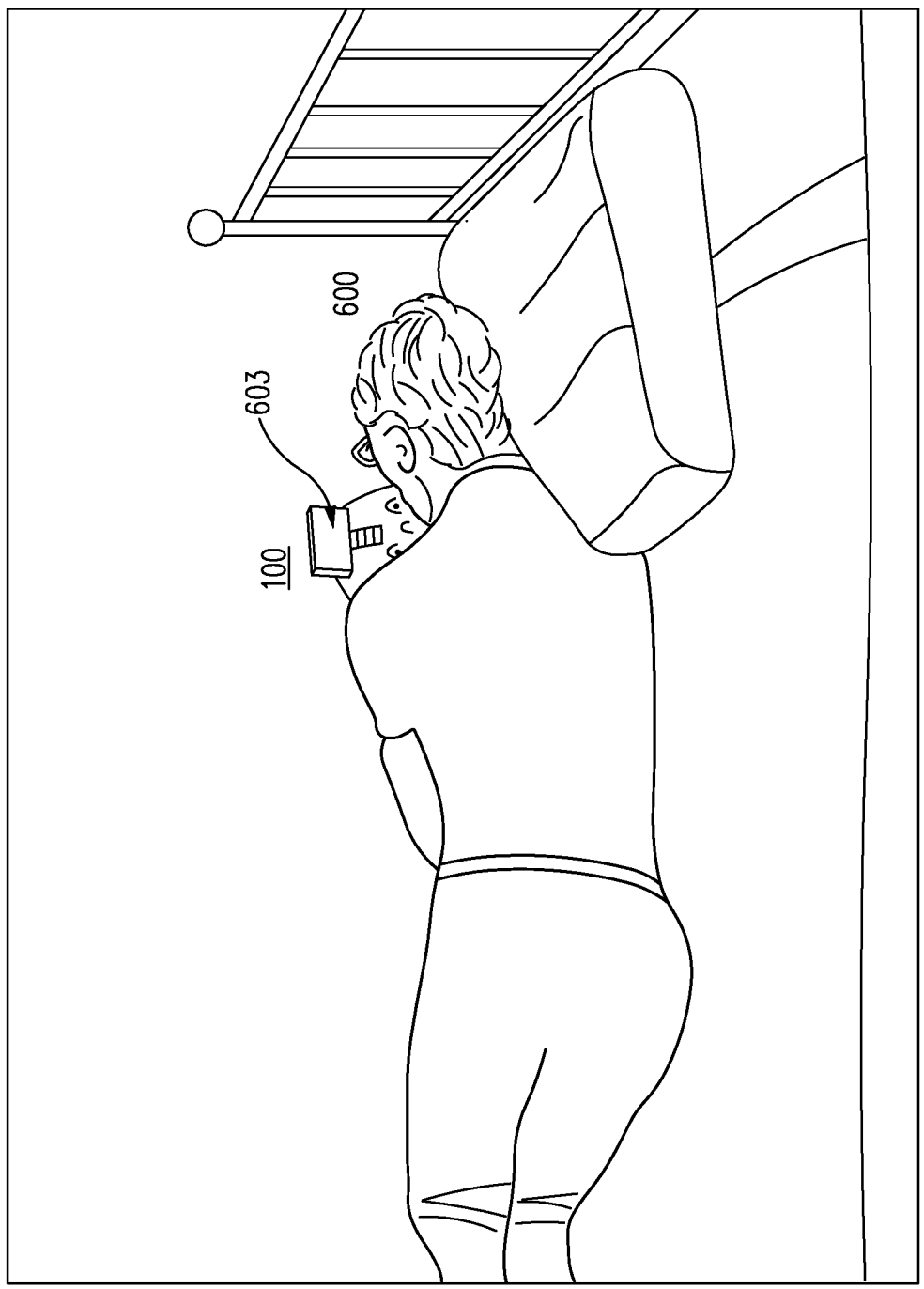

FIG. 6 is an illustration of structure 100 being utilized by a user 601 to view a portable device 603, in accordance with one embodiment. In the illustration of FIG. 6, user 601 is in a reclined position, lying on their side, and structure 100 is placed on the bed next to user 601, instead of directly on user 601's body. Using structure 100, user 601 is able to adjust the position of portable device 603, such that portable device 603 is held at an optimal hands-free device viewing angle while user 601 is lying on their side.

Figure 7:
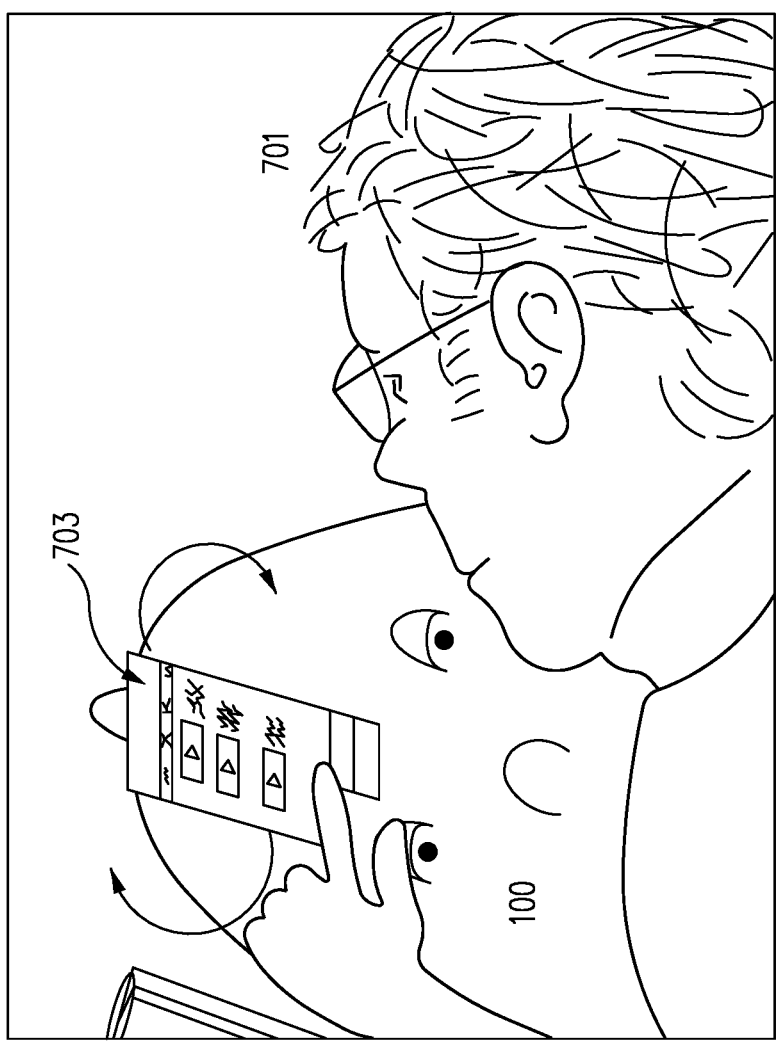

FIG. 7 is an illustration of structure 100 being utilized by a user 701 to view and interact with a portable device 703, in accordance with one embodiment. Referring now to FIG. 3A and FIG. 7 together, in the situation where portable device 703 is attached to mounting fixture 107 by way of upper buttonhole 109a or lower buttonhole 109b, portable device 703 is able to be rotated clockwise or counterclockwise from a position of origin. In one embodiment, portable device 703 is able to be rotated up to 90 degrees clockwise or counterclockwise from a position of origin. In one embodiment, portable device 703 is able to be rotated up to 360 degrees clockwise or counterclockwise from a position of origin. This allows user 701 to remain in a reclined position while adjusting the device viewing angle, without the need to detach portable device 703 from structure 101.

Figure 8:
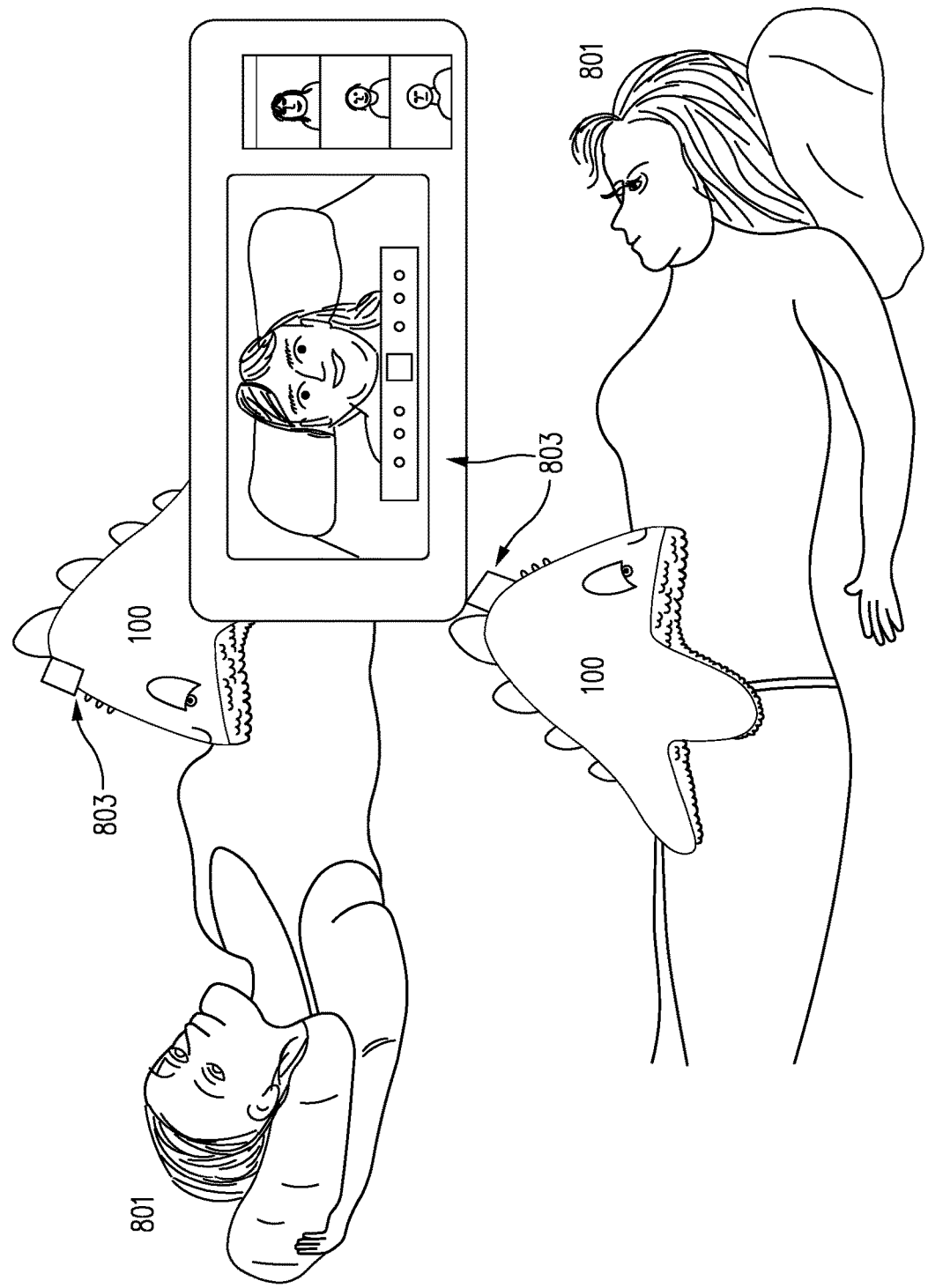

FIG. 8 is an illustration of structure 100 being utilized by a user 801 to participate in a video call or conference using portable device 803, in accordance with one embodiment. In the illustration of FIG. 8, user 801 is in a reclined position, viewing the screen of portable device 803, while lying flat on her back with her arms at her sides. This figure illustrates how structure 100 can be positioned comfortably at different locations on user 801's body, to allow user 801 to capture and/or share video of herself at an angle of her choosing, while simultaneously receiving video communications shared by one or more other individuals.

Figure 9:
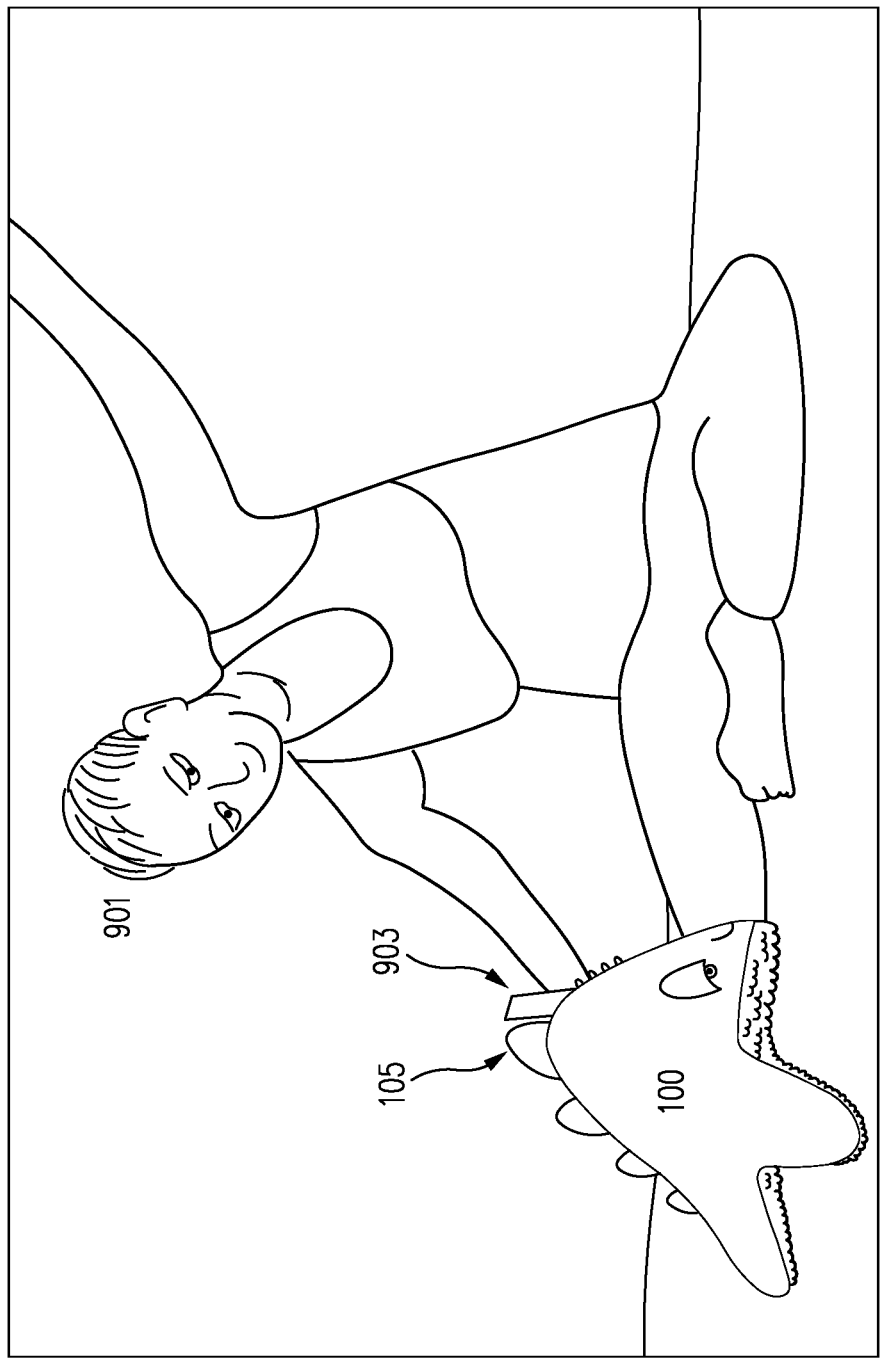

FIG. 9 is an illustration of structure 100 being utilized by a user 901 while viewing portable device 903 during an exercise activity, in accordance with one embodiment. In the illustration of FIG. 9, user 901 has placed structure 100 on the floor, and is able to adjust the angle of the portable device screen so that it is tilted upward, for achieving an optimal device viewing angle while performing floor exercises. In the illustrative embodiment of FIG. 9, upper mounting fixture support protrusion 105 is utilized to ensure that portable device 903 does not tip over backwards.

Figure 10:
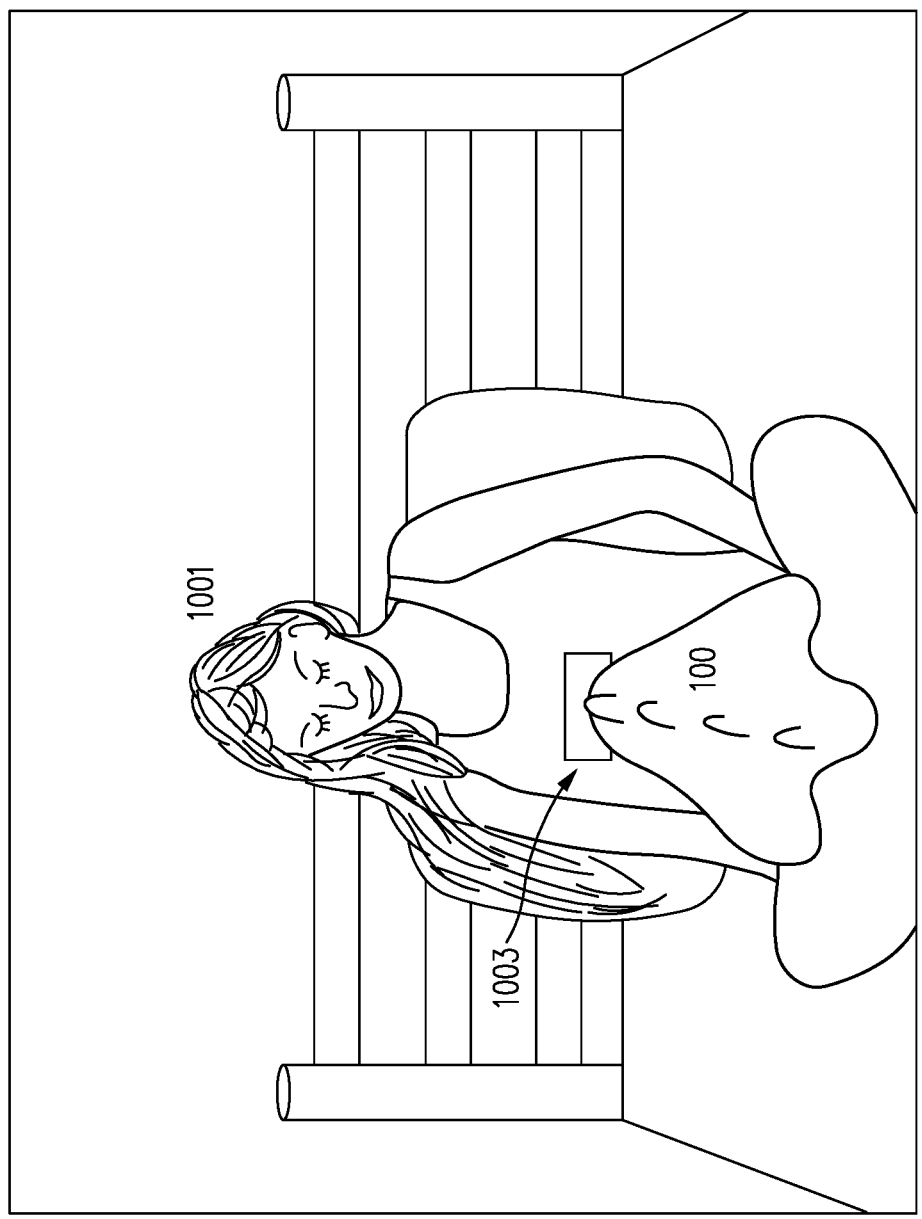

FIG. 10 is an illustration of structure 100 being utilized by a user 1001 while viewing the screen of portable device 1003, in accordance with one embodiment. In the illustration of FIG. 10, user 1001 is able to assume a comfortable position in bed and can place structure 100 on her lap to achieve an optimal device viewing angle.

Figure 11:
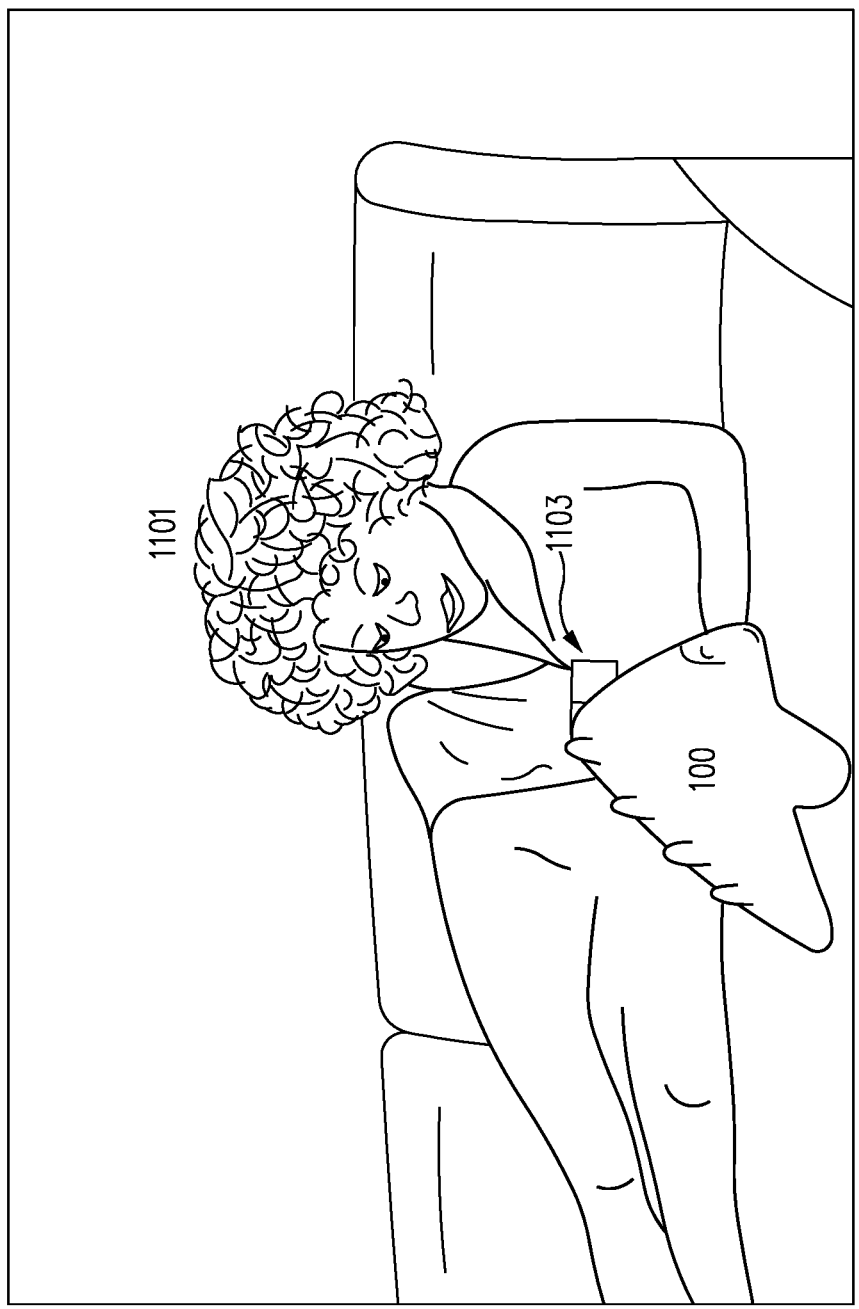

FIG. 11 is an illustration of structure 100 being utilized by a user 1101 while viewing the screen of portable device 1103, in accordance with one embodiment. In the illustration of FIG. 11, user 1101 is able to recline sideways on a couch while viewing the screen of portable device 1103. This figure illustrates the portability and versatility of structure 100.

Figure 12:
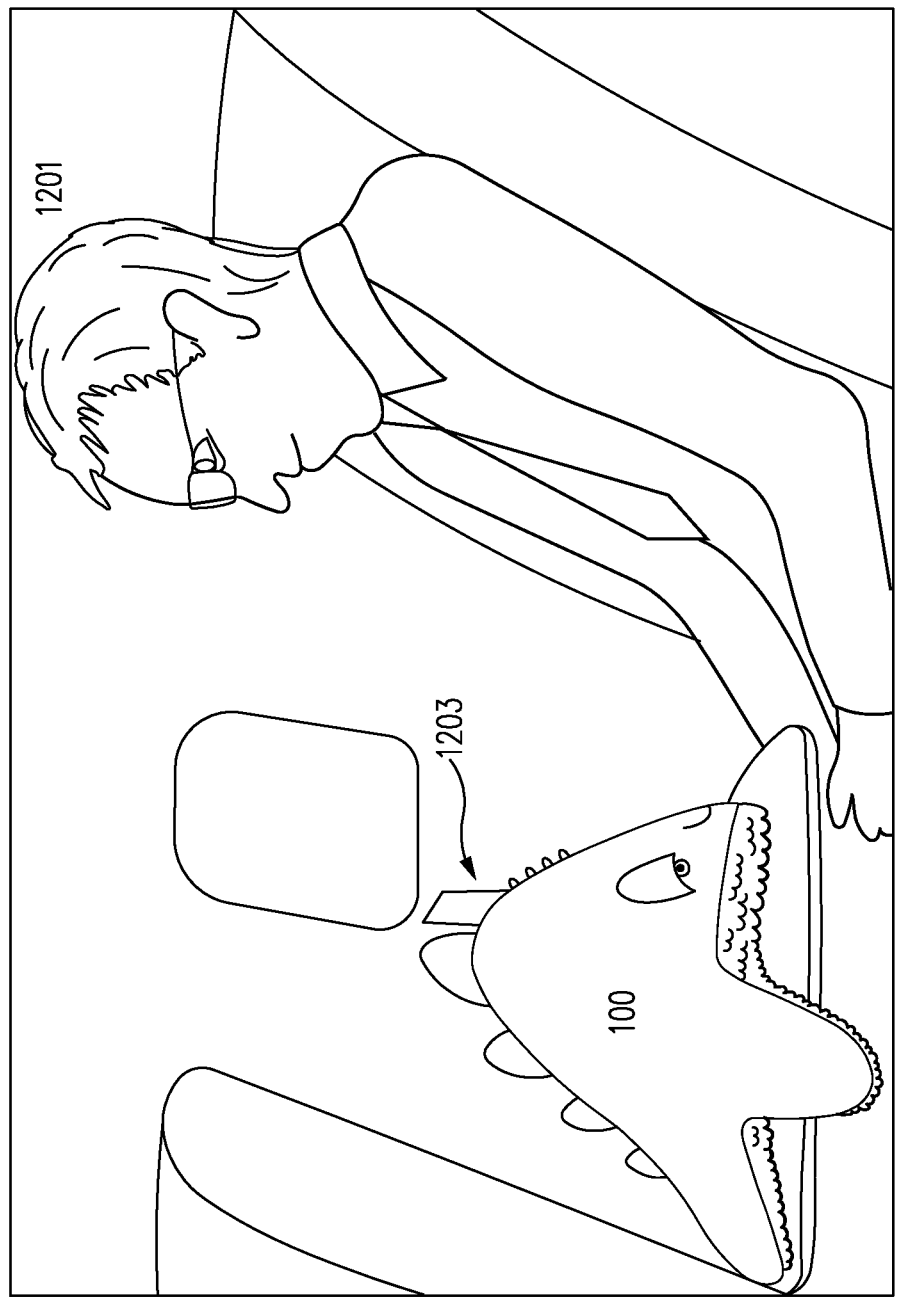

FIG. 12 is an illustration of structure 100 being utilized by a user 1201 while viewing the screen of portable device 1203, in accordance with one embodiment. In the illustration of FIG. 12, user 1201 is sitting upright in the seat of an aircraft, and is able to place structure 100 on top of a tray table in order to view the screen of portable device 1203 at an optimal device viewing angle. This figure illustrates that the structure disclosed herein is able to be picked up and freely moved from one location to another, without the need to detach the portable device from the structure.

Figure 13:
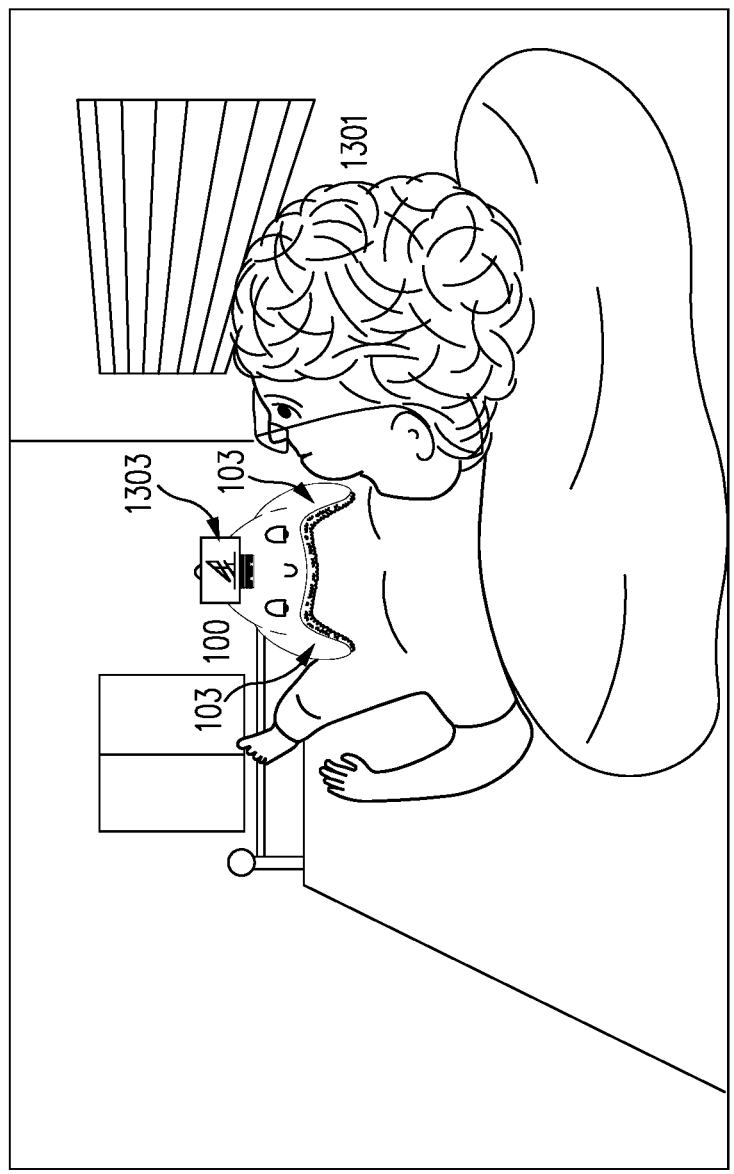

FIG. 13 is an illustration of structure 100 being utilized by a user 1301 while viewing the screen of portable device 1303, in accordance with one embodiment. In the illustration of FIG. 13, user 1301 is able to lie flat while viewing the screen of portable device 1303, and the lower stabilizing protrusions 103 of structure 100 conform to the body of user 1301.

Figure 14:
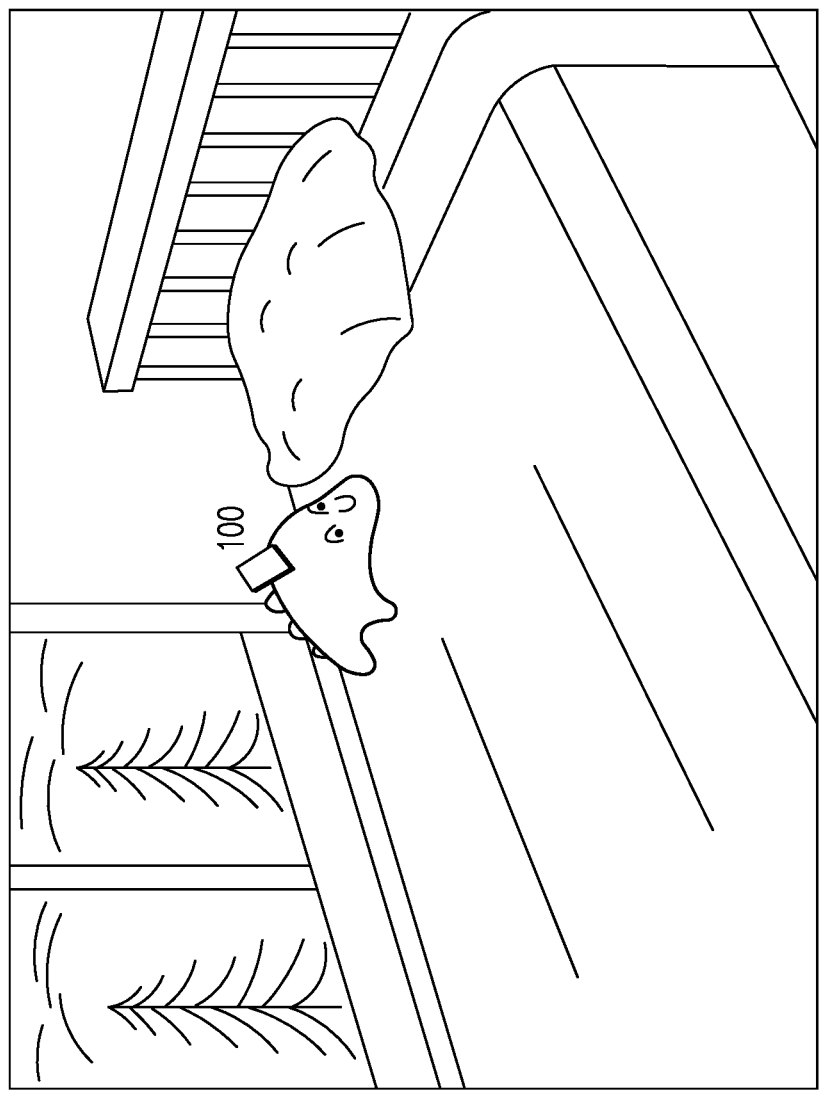

FIG. 14 is an illustration of structure 100 resting on a bed, in accordance with one embodiment. This figure illustrates that when not being utilized for viewing the screen of a portable device, structure 100 can be utilized as a decorative object around the house, for example, in a bedroom, where it is also readily available for use with a portable device.

Figure 15:
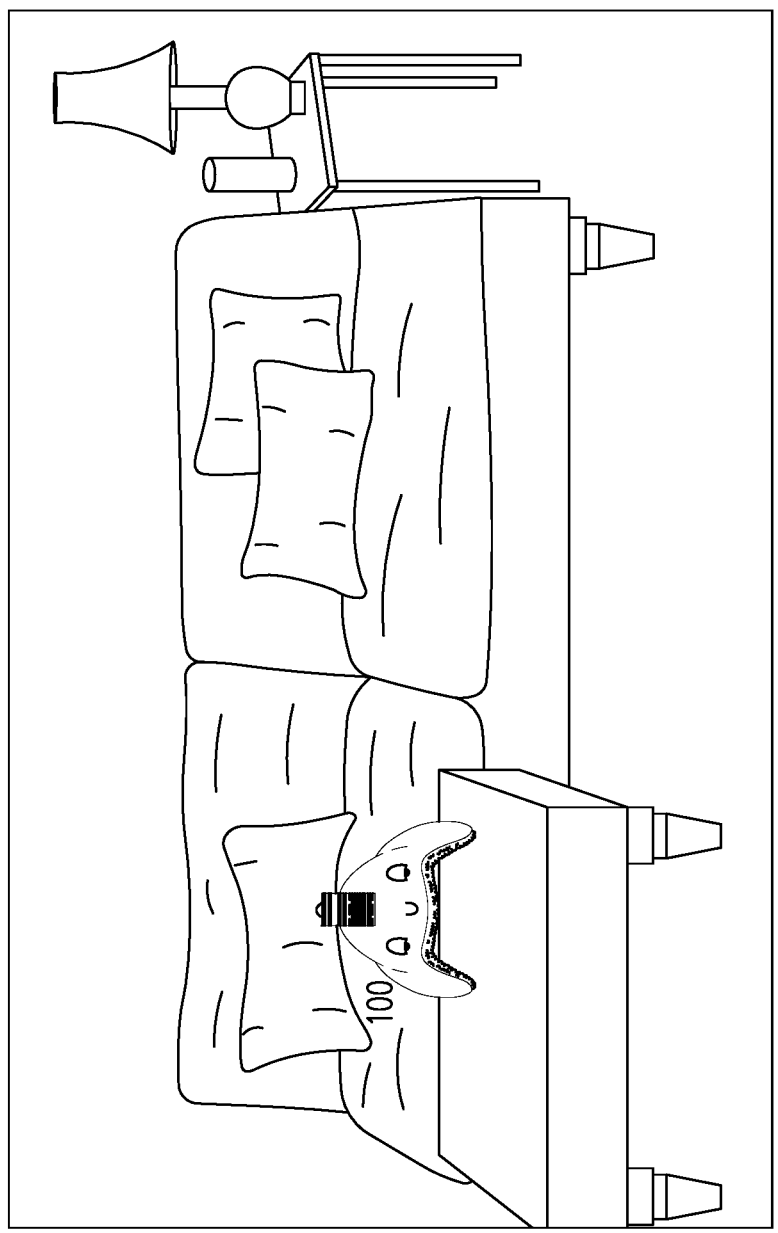

FIG. 15 is an illustration of structure 100 resting on living room furniture, in accordance with one embodiment. This figure illustrates that when not being utilized for viewing the screen of a portable device, structure 100 can be utilized as a decorative object around the house, for example, in a living room, where it is also readily available for use with a portable device.

Figure 16:
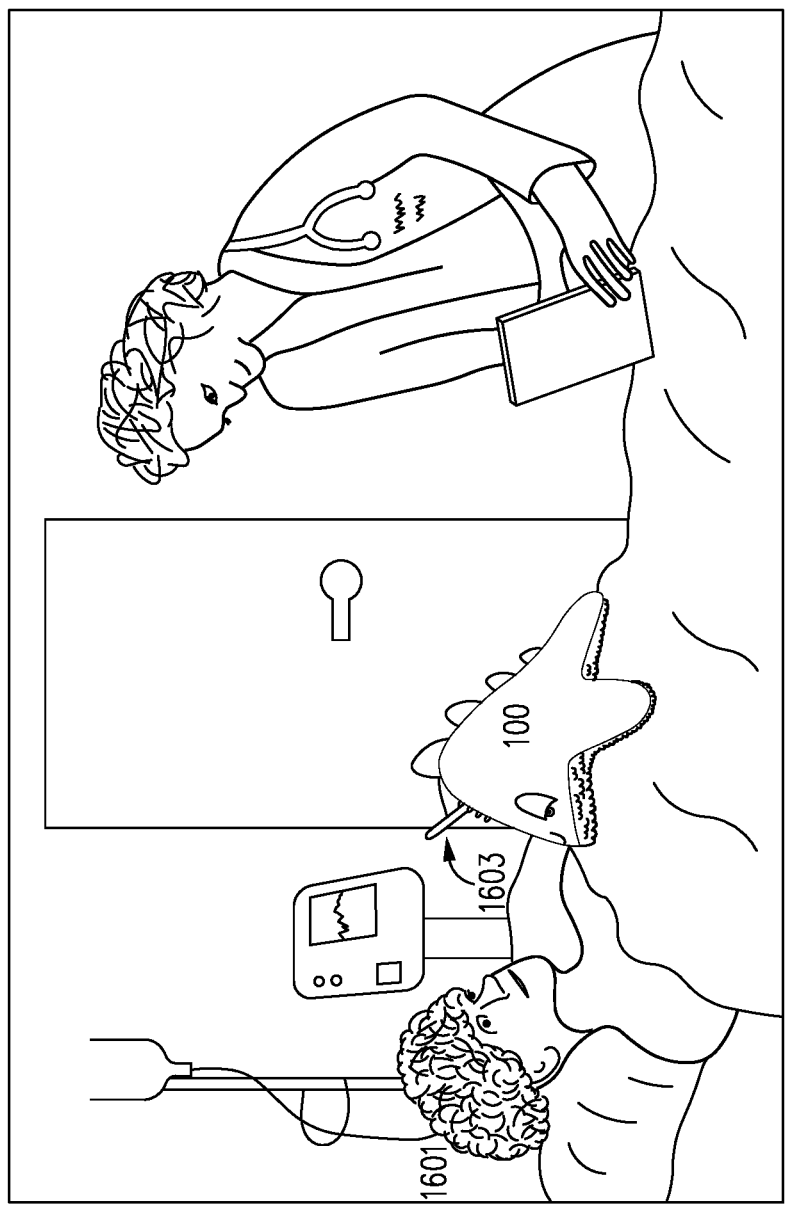

FIG. 16 is an illustration of structure 100 being utilized by a user 1601 while viewing the screen of portable device 1603 in a hospital bed, in accordance with one embodiment. This figure illustrates that structure 100 can be utilized to promote comfort and relaxation of a user.

Figure 17:
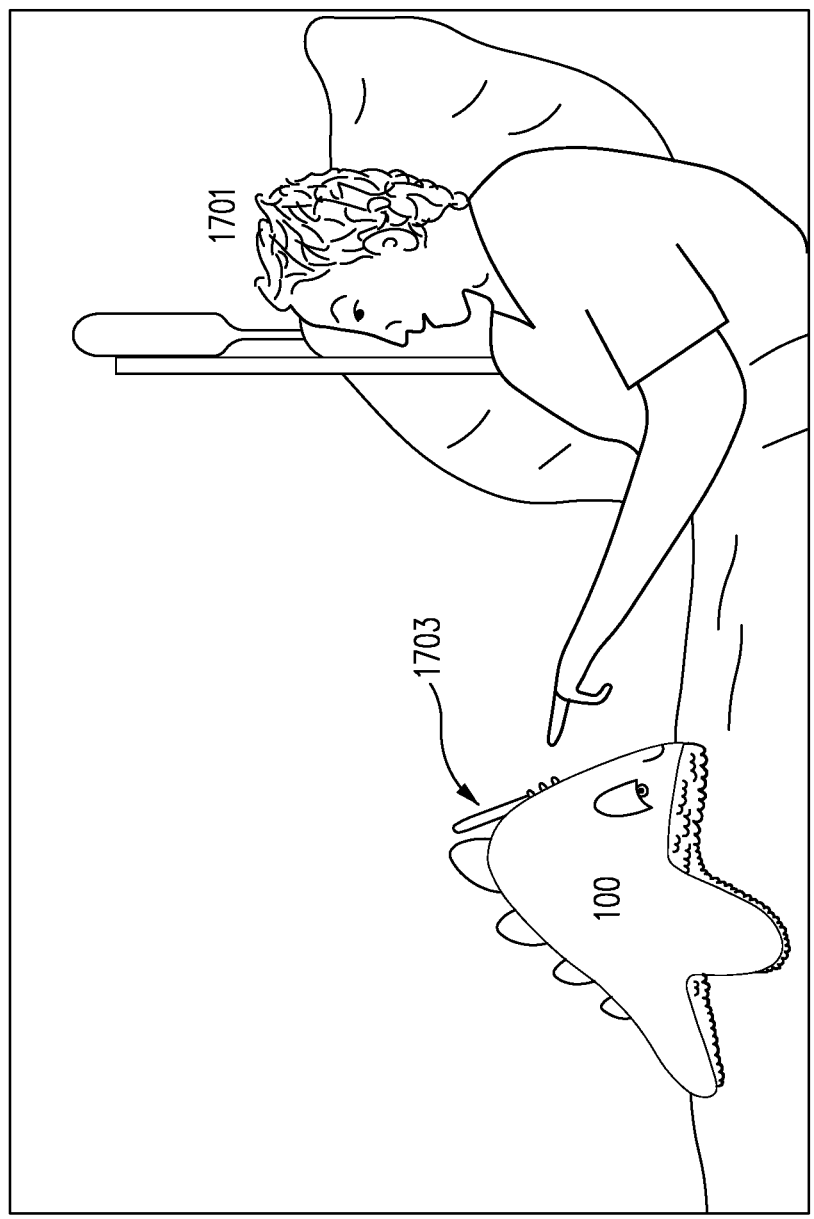

FIG. 17 is an illustration of structure 100 being utilized by a user 1701 while viewing the screen of portable device 1703 in a hospital bed, in accordance with one embodiment. This figure illustrates that structure 100 can be utilized to remain entertained and/or productive while having limited mobility, such as when confined to a bed.

Figure 18:
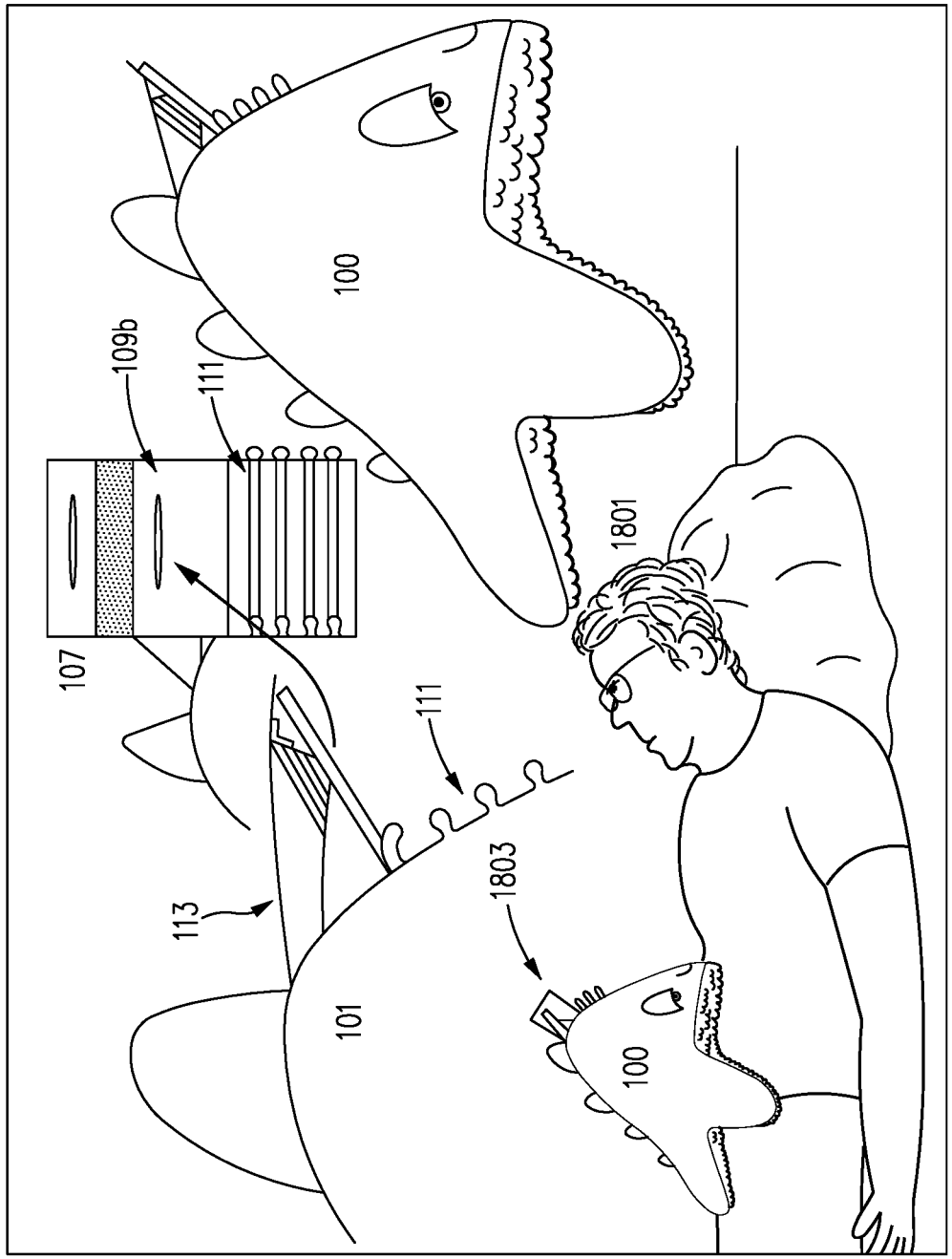

FIG. 18 is an illustration of structure 100 being utilized by a user 1801 while viewing the screen of portable device 1803, in accordance with one embodiment. In the illustration of FIG. 18, user 1801 is lying in bed and viewing the screen of portable device 1803 in landscape mode. FIG. 18 also shows exploded views of several of the components of mounting fixture 107, such as viewing angle adjustment notches 111. Of specific importance in FIG. 18 is lower buttonhole 109b, which is utilized in this illustrative embodiment for mounting portable device 1803 to mounting fixture 107 such that the screen of portable device 1803 can be viewed in landscape mode. Also shown in this illustration is another view of tethering mechanism 113, which is utilized to attach mounting fixture 107 to main body 101 of structure 100, as well as to hold mounting fixture 107 and portable device 1803 at an optimal device viewing angle.

Figure 19:
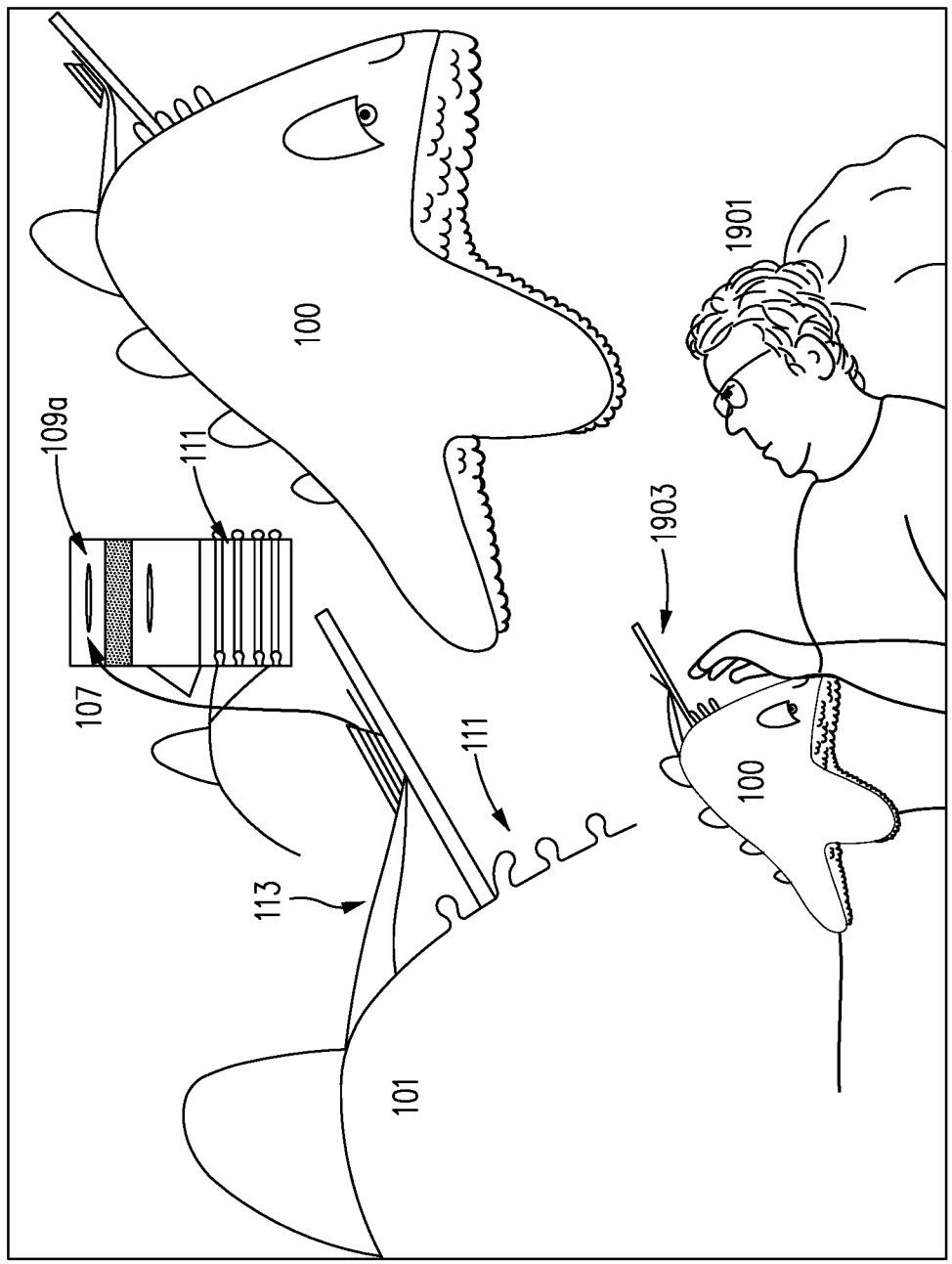

FIG. 19 is an illustration of structure 100 being utilized by a user 1901 while viewing the screen of portable device 1903, in accordance with one embodiment. In the illustration of FIG. 19, user 1901 is lying in bed and viewing the screen of portable device 1903 in portrait mode. FIG. 19 also shows exploded views of several of the components of mounting fixture 107, such as viewing angle adjustment notches 111. Of specific importance in FIG. 18 is upper buttonhole 109a, which is utilized in this illustrative embodiment for mounting portable device 1903 to mounting fixture 107 such that the screen of portable device 1903 can be viewed in portrait mode. Also shown in this illustration is another view of tethering mechanism 113, which is utilized to attach mounting fixture 107 to main body 101 of structure 100, as well as to hold mounting fixture 107 and portable device 1803 at an optimal device viewing angle.

As discussed above, the structure with mounting fixture for safe and stabilized viewing of portable devices disclosed herein provides solutions to the problems presented by prior art portable device viewing structures. For example, the structure disclosed herein allows for viewing of the portable device at a multitude of device viewing angles to accommodate a wide range of user viewing positions, including user viewing positions typically required for users who have visual acuity issues, such as nearsightedness or farsightedness. The structure disclosed herein is able to be picked up and freely moved from one location to another, while allowing the user to adjust the device viewing angle and distance without detaching the portable device from the structure. The structure disclosed herein does not require any tethering or attachment mechanisms that would obstruct the screen of the portable device, and the structure disclosed herein also does not require any stationary anchor, such as a headboard or a bedframe. The structure disclosed herein provides a secure mechanism for attaching the portable device to the structure, so as to limit the potential for damage to the device and/or injury to the user. The structure disclosed herein also provides stability and curvature such that, when resting on top of a user's body, the base of the structure comfortably and stably conforms to the shape of the user's body. The structure disclosed herein can also serve as a mount for a front or rear-facing camera of a portable device, and can also provide a place to store a portable device, such that the device can later be easily found. Further, the structure disclosed herein provides a physically soft complement to existing reclining furnishings in a user's household or other leisure activity setting, such that the structure promotes relaxation and blends in aesthetically with the user's surrounding environment.

In one embodiment, the structure with mounting fixture for stabilized viewing of a portable device comprises a main body, wherein the main body includes three or more lower stabilizing protrusions and an upper mounting fixture support protrusion. In one embodiment, the structure disclosed herein further includes a mounting fixture, wherein the mounting fixture includes one or more device attachment mechanisms and one or more viewing angle adjustment notches. In one embodiment, the structure disclosed herein further includes a tethering mechanism, wherein the tethering mechanism attaches the mounting fixture to the main body of the structure.

In one embodiment, the main body of the structure is comprised of a core material, wherein the core material is selected from the group of materials containing polyester, cotton, wool, bamboo, molded foam, polystyrene foam, polyethylene beads, polystyrene beads, plastic pellets, glass pellets, steel shots, steel beads, dried grains, pebbles, and sand. In one embodiment, the main body of the structure has a lower portion and an upper portion and the core material used for the lower portion of the main body is different than the core material used for the upper portion of the main body. In one embodiment the main body is an inflatable body.

In one embodiment, the main body of the structure further includes an outer casing, wherein the material used for the outer casing is selected from the group of materials containing microsuede, polyester plush fabric, velvet, fur, faux fur, fleece, sheepskin, rubberized fabric, cotton, and linen. In one embodiment, the outer casing includes one or more mechanisms for separating the outer casing from the core material. In one embodiment, the outer casing has both an upper body casing material and a lower surface casing material, the lower surface casing material being a different material than the upper body casing material. In various embodiments, the one or more device attachment mechanisms include one or more of buttonholes, slots, hook and loop fasteners, snaps, ties, and magnets.

In one embodiment, when the portable device is mounted to the mounting fixture, the portable device is in a position of origin which is parallel to the mounting fixture with a screen of the portable device facing outward and away from the mounting fixture. In one embodiment, when the portable device is mounted to the mounting fixture, the portable device is able to be rotated up to 90 degrees clockwise or 90 degrees counterclockwise from the position of origin. In one embodiment, when the portable device is mounted to the mounting fixture, the portable device is able to be rotated a full 360 degrees clockwise or 360 degrees counterclockwise from the position of origin.

In one embodiment, the tethering mechanism of the structure includes one or more pieces of material selected from the group of materials including elastic strap material composed of woven polyester and rubber, cloth, cord, string, rope, nylon, poly cord, rubber, polyester, neoprene, polystyrene, parachute cord, webbing, and hook-and-loop fasteners.

In one embodiment, when the portable device is mounted to the mounting fixture and is positioned at a vertical angle of 90 degrees from a plane of rest, the tethering mechanism enables a display screen of the portable device to be suspended at a downwards angle from the angle of 90 degrees to an angle of between 89 degrees and 0 degrees from the plane of rest.

In one embodiment, when the portable device is mounted to the mounting fixture and is positioned at a vertical angle of 90 degrees from a plane of rest, the upper mounting fixture support protrusion enables a display screen of the portable device to be securely tilted at an upward angle from the angle of 90 degrees to an angle of between 91 degrees and 180 degrees from the plane of rest.

In one embodiment, the height of the main body, not including the lower stabilizing protrusions or upper mounting fixture support protrusion, is between 4.75 and 19 inches. In one embodiment, the height of the main body, not including the lower stabilizing protrusions or upper mounting fixture support protrusion, is 9.5 inches.

In one embodiment, a structure with mounting fixture for stabilized viewing of a portable device comprises a main body, comprised of a core material and an outer casing, wherein the core material is polyester fiber, and further wherein the material used for an upper portion of the outer casing is a polyester plush fabric and the material used for a lower portion of the outer casing is polyester fleece. In one embodiment, the main body further includes three or more lower stabilizing protrusions, an upper mounting fixture support protrusion, a mounting fixture, one or more device attachment mechanisms, one or more viewing angle adjustment notches, and a tethering mechanism, wherein the material used for the tethering mechanism is elastic strap material composed of woven polyester and rubber.

In one embodiment, a method for providing stabilized viewing of a portable device comprises providing a core material, wherein the core material is polyester fiber, and providing an outer casing, wherein the materials used for the outer casing include polyester plush fabric and fleece. In one embodiment, the method further comprises inserting the core material into the outer casing to form a main body, wherein the main body includes three or more lower stabilizing protrusions and an upper mounting fixture support protrusion. In one embodiment, the method further comprises providing a mounting fixture, wherein the mounting fixture includes one or more device attachment mechanisms, and one or more viewing angle adjustment notches, and providing a tethering mechanism, wherein the material used for the tethering mechanism is elastic strap material composed of woven polyester and rubber.

In one embodiment, the method for providing stabilized viewing of a portable device further includes attaching the mounting fixture to the main body using the tethering mechanism such that when the portable device is mounted to the mounting fixture and is positioned at a vertical angle of 90 degrees from a plane of rest, the tethering mechanism enables a display screen of the portable device to be suspended at a downwards angle from the angle of 90 degrees to an angle of between 89 degrees and 0 degrees from the plane of rest, and further wherein the upper mounting fixture support protrusion enables a display screen of the portable device to be securely tilted at an upward angle from the angle of 90 degrees to an angle of between 91 degrees and 180 degrees from the plane of rest.

The present invention has been described in particular detail with respect to specific possible embodiments. Those of skill in the art will appreciate that the invention may be practiced in other embodiments. For example, the nomenclature used for components, capitalization of component designations and terms, and any other attributes, is not significant, mandatory, or limiting, and the mechanisms that implement the invention or its features can have various different names or formats. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A structure with mounting fixture for stabilized viewing of a portable device comprising:
    a main body, wherein the main body includes three or more lower stabilizing protrusions and an upper mounting fixture support protrusion, and further wherein:
    the first lower protrusion protrudes from the right side of the main body and extends outwards, away from the right side of the main body;
    the second lower protrusion protrudes from the left side of the main body and extends outwards, away from the left side of the main body;
    the third lower protrusion protrudes from the rear side of the main body and extends outwards, away from the rear side of the main body; and further wherein the three or more lower stabilizing protrusions are semi-flexible, such that they can conform to the shape of the surface on which the structure is resting;
    the upper mounting fixture support protrusion protrudes from the top side of the main body and extends upwards, perpendicularly away from the top of the main body;
    a mounting fixture, wherein the mounting fixture includes one or more device attachment mechanisms, and one or more viewing angle adjustment notches, wherein the one or more viewing angle adjustment notches protrude outward from the mounting fixture and are positioned such that one end of a portable device can be rested on top of one of the viewing angle adjustment notches; and
    a tethering mechanism, including one or more strips of material, wherein a first end of the tethering mechanism is attached to the top of the main body, and a second end of the tethering mechanism is attached to the back of the mounting fixture, such that the tethering mechanism loosely attaches the mounting fixture to the main body, enabling the portable device to be suspended at a downwards angle when the portable device is mounted on the mounting fixture.

2. The structure of claim 1 wherein the main body is comprised of a core material.

3. The structure of claim 2 wherein the core material is selected from the group of materials containing:
    polyester;
    cotton;
    wool;
    bamboo;
    molded foam;
    polystyrene foam;
    polyethylene beads;
    polystyrene beads;
    plastic pellets;
    glass pellets;
    steel shots;
    steel beads;
    dried grains;
    pebbles; and
    sand.

4. The structure of claim 3 wherein the main body has a lower portion and an upper portion and the core material used for the lower portion of the main body is different than the core material used for the upper portion of the main body.

5. The structure of claim 2 wherein the main body further includes an outer casing.

6. The structure of claim 5 wherein the material used for the outer casing is selected from the group of materials containing:
    microsuede;
    polyester plush fabric;
    velvet;
    fur;
    faux fur;
    fleece;
    sheepskin;
    rubberized fabric;
    cotton; and
    linen.

7. The structure of claim 5 wherein the outer casing includes one or more mechanisms for separating the outer casing from the core material.

8. The structure of claim 5 wherein the outer casing has both an upper body casing material and a lower surface casing material, the lower surface casing material being a different material than the upper body casing material.

9. The structure of claim 1 wherein the main body is an inflatable body.

10. The structure of claim 1 wherein the one or more device attachment mechanisms include one or more of:
    buttonholes;
    slots;
    hook and loop fasteners;
    snaps;
    ties; and
    magnets.

11. The structure of claim 1 wherein, when the portable device is mounted to the mounting fixture, the portable device is in a position of origin which is parallel to the mounting fixture with a screen of the portable device facing outward and away from the mounting fixture.

12. The structure of claim 11 wherein the portable device is able to be rotated up to 90 degrees clockwise or 90 degrees counterclockwise from the position of origin.

13. The structure of claim 11 wherein the portable device is able to be rotated a full 360 degrees clockwise or 360 degrees counterclockwise from the position of origin.

14. The structure of claim 1 wherein the tethering mechanism includes one or more pieces of material selected from the group of materials including:
    elastic strap material composed of woven polyester and rubber;
    cloth;
    cord;
    string;
    rope;
    nylon;
    poly cord;

rubber;
polyester;
neoprene;
polystyrene;
parachute cord;
webbing; and
hook-and-loop fasteners.

15. The structure of claim 1 wherein, when the portable device is mounted to the mounting fixture and is positioned at a vertical angle of 90 degrees from a plane of rest, the tethering mechanism enables a display screen of the portable device to be suspended at a downwards angle from the angle of 90 degrees to an angle of between 89 degrees and 0 degrees from the plane of rest.

16. The structure of claim 1 wherein, when the portable device is mounted to the mounting fixture and is positioned at a vertical angle of 90 degrees from a plane of rest, the upper mounting fixture support protrusion enables a display screen of the portable device to be securely tilted at an upward angle from the angle of 90 degrees to an angle of between 91 degrees and 180 degrees from the plane of rest.

17. The structure of claim 1 wherein, the height of the main body, not including the lower stabilizing protrusions or upper mounting fixture support protrusion, is between 4.75 and 19 inches.

18. The structure of claim 1 wherein, the height of the main body, not including the lower stabilizing protrusions or upper mounting fixture support protrusion, is 9.5 inches.

19. A structure with mounting fixture for stabilized viewing of a portable device comprising:
   a main body, comprised of a core material and an outer casing, wherein the core material is polyester fiber, and further wherein the material used for an upper portion of the outer casing is a polyester plush fabric and the material used for a lower portion of the outer casing is polyester fleece;
   three or more lower stabilizing protrusions wherein:
      the first lower protrusion protrudes from the right side of the main body and extends outwards, away from the right side of the main body;
      the second lower protrusion protrudes from the left side of the main body and extends outwards, away from the left side of the main body;
      the third lower protrusion protrudes from the rear side of the main body and extends outwards, away from the rear side of the main body; and further wherein the three or more lower stabilizing protrusions are semi-flexible, such that they can conform to the shape of the surface on which the structure is resting;
   an upper mounting fixture support protrusion, wherein the upper mounting fixture support protrusion protrudes from the top side of the main body and extends upwards, perpendicularly away from the top of the main body;
   a mounting fixture including;
      one or more device attachment mechanisms; and
      one or more viewing angle adjustment notches, wherein the one or more viewing angle adjustment notches protrude outward from the mounting fixture and are positioned such that one end of a portable device can be rested on top of one of the viewing angle adjustment notches; and
   a tethering mechanism, including one or more strips of material, wherein a first end of the tethering mechanism is attached to the top of the main body, and a second end of the tethering mechanism is attached to the back of the mounting fixture, such that the tethering mechanism loosely attaches the mounting fixture to the main body, enabling the portable device to be suspended at a downwards angle when the portable device is mounted on the mounting fixture.

20. A method for providing stabilized viewing of a portable device comprising:
   providing a core material, wherein the core material is polyester fiber;
   providing an outer casing, wherein the materials used for the outer casing include polyester plush fabric and fleece;
   inserting the core material into the outer casing to form a main body, wherein the main body includes three or more lower stabilizing protrusions and an upper mounting fixture support protrusion, and further wherein:
      the first lower protrusion protrudes from the right side of the main body and extends outwards, away from the right side of the main body;
      the second lower protrusion protrudes from the left side of the main body and extends outwards, away from the left side of the main body;
      the third lower protrusion protrudes from the rear side of the main body and extends outwards, away from the rear side of the main body; and further wherein the three or more lower stabilizing protrusions are semi-flexible, such that they can conform to the shape of the surface on which the structure is resting;
      the upper mounting fixture support protrusion protrudes from the top side of the main body and extends upwards, perpendicularly away from the top of the main body;
   providing a mounting fixture, wherein the mounting fixture includes one or more device attachment mechanisms, and one or more viewing angle adjustment notches, further wherein the one or more viewing angle adjustment notches protrude outward from the mounting fixture and are positioned such that one end of a portable device can be rested on top of one of the viewing angle adjustment notches;
   providing a tethering mechanism, wherein the material used for the tethering mechanism is elastic strap material composed of woven polyester and rubber; and
   attaching the mounting fixture to the main body using the tethering mechanism such that when the portable device is mounted to the mounting fixture and is positioned at a vertical angle of 90 degrees from a plane of rest, the tethering mechanism enables a display screen of the portable device to be suspended at a downwards angle from the angle of 90 degrees to an angle of between 89 degrees and 0 degrees from the plane of rest, and further wherein the upper mounting fixture support protrusion enables a display screen of the portable device to be securely tilted at an upward angle from the angle of 90 degrees to an angle of between 91 degrees and 180 degrees from the plane of rest.

* * * * *